United States Patent
Chen et al.

(10) Patent No.: US 9,977,699 B2
(45) Date of Patent: May 22, 2018

(54) ENERGY EFFICIENT MULTI-CLUSTER SYSTEM AND ITS OPERATIONS

(71) Applicant: MediaTek Inc., Hsinchu (TW)

(72) Inventors: Jia-Ming Chen, Zhubei (TW);
Hung-Lin Chou, Zhubei (TW);
Ya-Ting Chang, Hsinchu (TW);
Shih-Yen Chiu, Hsinchu (TW);
Chia-Hao Hsu, Lukang (TW);
Yu-Ming Lin, Taipei (TW);
Wan-Ching Huang, Hsinchu (TW);
Jen-Chieh Yang, Hsinchu (TW);
Pi-Cheng Hsiao, Taichung (TW)

(73) Assignee: MediaTek, Inc., Hsinchu (TW)

( * ) Notice: Subject to any disclaimer, the term of this patent is extended or adjusted under 35 U.S.C. 154(b) by 45 days.

(21) Appl. No.: 14/936,686

(22) Filed: Nov. 10, 2015

(65) Prior Publication Data

US 2016/0139964 A1    May 19, 2016

Related U.S. Application Data

(63) Continuation-in-part of application No. 14/931,923, filed on Nov. 4, 2015.
(Continued)

(51) Int. Cl.
*G06F 9/46* (2006.01)
*G06F 9/50* (2006.01)
*G06F 1/32* (2006.01)

(52) U.S. Cl.
CPC .......... *G06F 9/5094* (2013.01); *G06F 1/3206* (2013.01); *G06F 1/329* (2013.01);
(Continued)

(58) Field of Classification Search
None
See application file for complete search history.

(56) References Cited

U.S. PATENT DOCUMENTS 7,318,164 B2    1/2008  Rawson, III
2009/0222654 A1    9/2009  Hum et al.
(Continued)

FOREIGN PATENT DOCUMENTS

CN        102812445 A        12/2012

OTHER PUBLICATIONS

Mitra, "Energy-Efficient Computing with Heterogeneous Multi-Cores", 2014, IEEE.*
(Continued)

*Primary Examiner* — Kenneth Tang
(74) *Attorney, Agent, or Firm* — The Law Office of Tong Lee

(57) ABSTRACT

A multi-cluster system having processor cores of different energy efficiency characteristics is configured to operate with high efficiency such that performance and power requirements can be satisfied. The system includes multiple processor cores in a hierarchy of groups. The hierarchy of groups includes: multiple level-1 groups, each level-1 group including one or more of processor cores having identical energy efficiency characteristics, and each level-1 group configured to be assigned tasks by a level-1 scheduler; one or more level-2 groups, each level-2 group including respective level-1 groups, the processor cores in different level-1 groups of the same level-2 group having different energy efficiency characteristics, and each level-2 group configured to be assigned tasks by a respective level-2 scheduler; and a level-3 group including the one or more level-2 groups and configured to be assigned tasks by a level-3 scheduler.

33 Claims, 13 Drawing Sheets

Related U.S. Application Data

(60) Provisional application No. 62/148,325, filed on Apr. 16, 2015, provisional application No. 62/126,963, filed on Mar. 2, 2015, provisional application No. 62/080,617, filed on Nov. 17, 2014, provisional application No. 62/111,138, filed on Feb. 3, 2015.

(52) U.S. Cl.
CPC ...... *G06F 1/3287* (2013.01); *G06F 2209/505* (2013.01); *Y02B 60/1282* (2013.01); *Y02B 60/142* (2013.01); *Y02B 60/144* (2013.01)

(56) References Cited

U.S. PATENT DOCUMENTS

| | | | |
|---|---|---|---|
| 2013/0167152 A1* | 6/2013 | Jeong | G06F 9/4881 718/102 |
| 2013/0205126 A1 | 8/2013 | Kruglick | |
| 2014/0095801 A1 | 4/2014 | Bodas et al. | |
| 2014/0129808 A1 | 5/2014 | Naveh et al. | |
| 2014/0173623 A1 | 6/2014 | Chang et al. | |
| 2016/0011907 A1* | 1/2016 | Moyer | G06F 9/4843 718/104 |
| 2016/0147290 A1* | 5/2016 | Williamson | G06F 1/3275 713/323 |

OTHER PUBLICATIONS

Lastovetsky, "Heterogeneous Parallel Computing: from Clusters of Workstations to Hierarchical Hybrid Platforms", 2014, SuperFri. org, pp. 70-87.*

PCT/CN2015/094672 filed Nov. 16, 2015; Notice of International Search Report and Written Opinion dated Feb. 15, 2016.

\* cited by examiner

ENERGY EFFICIENT MULTI-CLUSTER SYSTEM AND ITS OPERATIONS

CROSS-REFERENCE TO RELATED APPLICATIONS

This application is a continuation-in-part of U.S. patent application Ser. No. 14/931,923 filed on Nov. 4, 2015, and claims the benefit of U.S. Provisional Application No. 62/080,617 filed on Nov. 17, 2014, U.S. Provisional Application No. 62/111,138 filed on Feb. 3, 2015, U.S. Provisional Application No. 62/126,963 filed on Mar. 2, 2015, and U.S. Provisional Application No. 62/148,325 filed on Apr. 16, 2015.

TECHNICAL FIELD

Embodiments of the invention relate to a multi-cluster system; and more specifically, to performance and power management in a multi-cluster system that includes processor cores of different energy efficiency characteristics.

BACKGROUND

Dynamic frequency scaling is a technique that automatically adjusts the frequency of a processor at runtime. An increase in the operating frequency of a processor can ramp up the computing performance. However, a frequency increase means that power consumption of the processor also increases, as the power consumption in an integrated circuit is computed as: $P=C\times V^2 \times F$, where P is the power, C is the capacitance being switched per clock cycle, V is the voltage and F is the frequency. Some modern computer systems have a built-in management framework to manage the tradeoff between performance and power consumption. For example, the management framework may determine at runtime whether to increase or decrease the operating frequency, and whether to activate or deactivate a processor core, in order to satisfy system performance requirements or to save power.

In a multi-cluster system that has multiple processor types, the management framework needs to take into consideration both power consumption and performance of each processor type. If only one processor type is allowed to operate at a time, the processing capacity of the other processor types is under-utilized and may not satisfy a high workload demand. In a system that allows multiple processor types to operate at the same time, the management framework needs to have a strategy for optimizing efficiency and low power operations.

Therefore, there is a need to improve the power and performance management in a multi-cluster system that has multiple processor types.

SUMMARY

In one embodiment, a computing system is provided that comprises a plurality of processor cores in a hierarchy of groups. The hierarchy of groups comprises: a plurality of level-1 groups, each of the level-1 groups including one or more of the processor cores having identical energy efficiency characteristics, and each of the level-1 groups configured to be assigned first tasks by a respective level-1 scheduler; one or more level-2 groups, each of the one or more level-2 groups including a respective plurality of level-1 groups, the processor cores in different level-1 groups of the same level-2 group having different energy efficiency characteristics, and each of the one or more level-2 groups configured to be assigned second tasks by a respective level-2 scheduler; and a level-3 group including the one or more level-2 groups and configured to be assigned third tasks by a level-3 scheduler. It is noted that the first, second, and third tasks may be the same or different tasks.

In another embodiment, a computing system is provided that comprises a plurality of processor cores in a hierarchy of groups. The hierarchy of groups comprises: a plurality of level-1 groups, each of the level-1 groups including one or more of the processor cores and configured to have a Symmetric Multiprocessing (SMP) architecture; one or more level-2 groups, each of the one or more level-2 groups including a respective plurality of level-1 groups, the processor cores in different level-1 groups of the same level-2 group having different energy efficiency characteristics; and a level-3 group, including the one or more level-2 groups and configured to have a Heterogeneous Multiprocessing (HMP) architecture.

In yet another embodiment, a computing system is provided that comprises a plurality of processor cores in a hierarchy of groups. The hierarchy of groups comprises: one or more leaf-level groups, at least two of the processor cores in at least one leaf-level group having different energy efficiency characteristics, and each of the one or more leaf-level groups configured to be assigned first tasks by a respective leaf-level scheduler; and a root-level group, including the one or more leaf-level groups and configured to be assigned second tasks by a root-level scheduler. It is noted that the first and second tasks may be the same or different tasks.

In yet another embodiment, a computing system is provided that comprises a plurality of processor cores in a hierarchy of groups. The hierarchy of groups comprises: one or more leaf-level groups, at least two of the processor cores in at least one leaf-level group having different energy efficiency characteristics; and a root-level group, including the one or more leaf-level groups and configured to have an HMP architecture.

According to embodiments described herein, a multi-cluster system having processor cores of different energy efficiency characteristics can operate with high efficiency such that the performance and power requirements can be satisfied.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
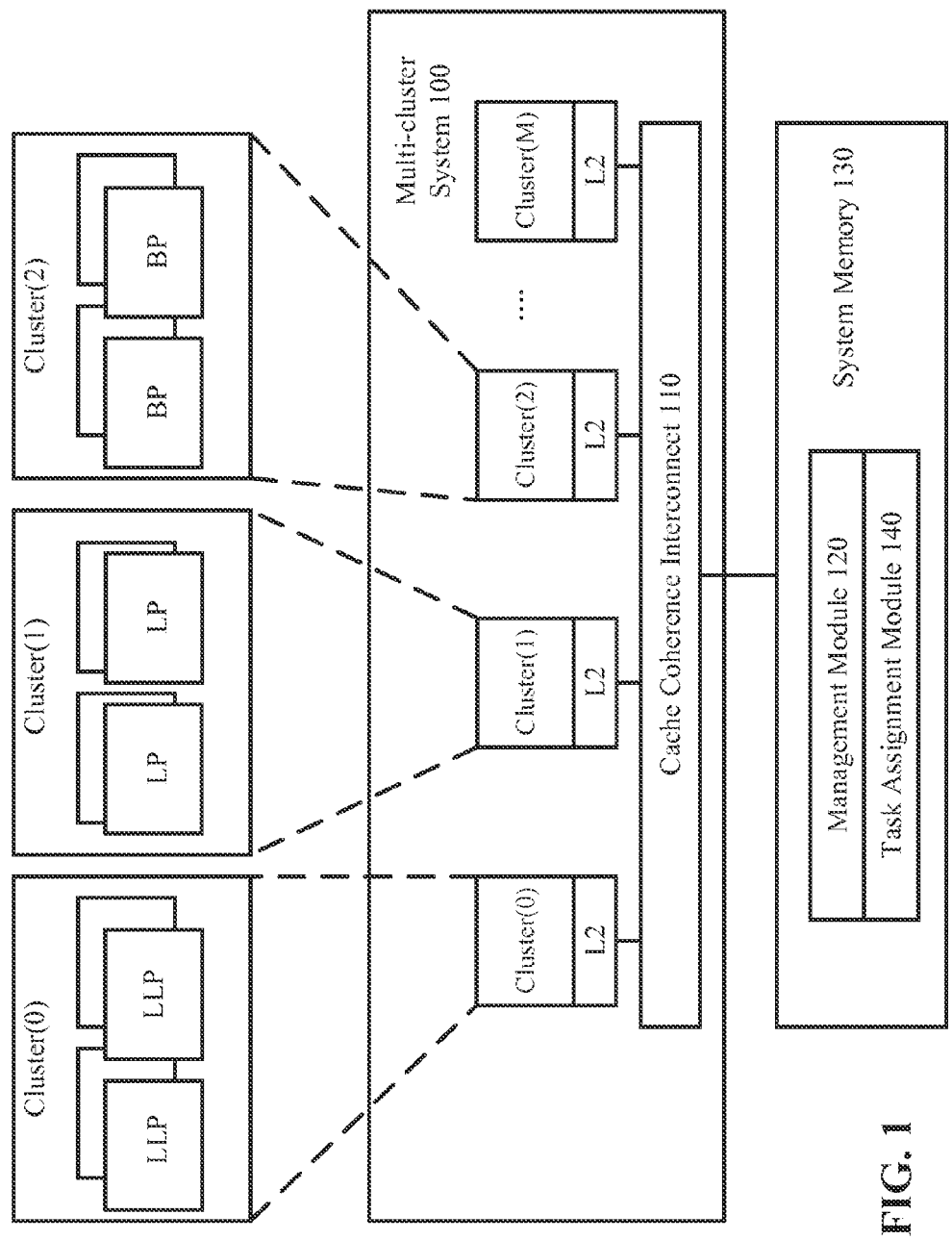
FIG. 1 illustrates an example of a multi-cluster system according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

It should be noted that the term "multi-cluster system" as used herein is a "multi-core processor system" arranged and managed as multiple clusters. A multi-core processor system may be a multi-core system or a multi-processor system, depending upon the actual design. In other words, the proposed system and method may be applicable to any multi-core system and any multi-processor system that is arranged and managed as multiple clusters. For example, concerning the multi-core system, all of the processor cores may be disposed in one processor. As another example, concerning the multi-processor system, each of the processor cores may be disposed in one processor. Hence, each of the clusters may be implemented as a group of one or more processors.

Furthermore, a "processor group" as used herein means a group of processor cores at a specific level, e.g., a level-1 group, a level-2 group or a level-3 group. Moreover, the term "type" in connection with a "processor type" refers to common characteristics shared by a group of processor cores, where the common characteristics include, but are not limited to, either or both of energy efficiency characteristics and computation performance. The computation performance may be measured by, e.g., million-instruction-per-second (MIPS). The "energy efficiency," or equivalently, "power efficiency" of a processor core is measured with respect to a frequency or a frequency range. A number of metrics may be used for the measurements, one of which is MIPS/MW, which stands for MIPS/megawatt, or MHz/MW, which stands for megahertz/megawatt. Energy efficiency is opposite to power consumption; processor cores that have high energy efficiency in a frequency range consume low power in that frequency range. In addition, the term "substantially the same" hereinafter means "the same" or "within a predetermined tolerance range."

Moreover, the term "deactivating a processor core" means that the processor core is either powered off completely (i.e., receiving no power) or enters a low-power state. A processor core may be powered off by hot-plug (i.e., powered off or physically removed during operating system runtime) or other mechanisms. "Deactivating a cluster" means that all processor cores in that cluster either are powered off completely or enter a low-power state. "Activating a processor core" means that the processor core is powered on and enters either a standby state or an active state of executing instructions. "Activating a cluster" means that one or more processor cores in that cluster enter a standby or active state. An "activated" processor core or cluster is also referred to as an "active" processor or cluster. Similarly, a "deactivated" processor core or cluster is also referred to as an "inactive" processor core or cluster.

FIG. 1 illustrates an example of a multi-cluster system 100 according to one embodiment. In this example, the multi-cluster system 100 includes Cluster(0), Cluster(1), . . . , Cluster(M). In alternative embodiments, the multi-cluster system 100 may include any number of clusters that is at least two. Each cluster includes one or more processor cores that share the same L2 cache or additional levels of caches. Each cluster also has access to a system memory 130 via a cache coherence interconnect 110.

In one embodiment, the multi-cluster system 100 uses a management module 120 that activates and/or de-activates processor cores or clusters to satisfy system design requirements such as to achieve energy efficiency. The multi-cluster system 100 also uses a task assignment module 140 that assigns and schedules tasks among the processor cores. The assignment may achieve workload balance within each cluster and optimize work distribution across the clusters. In one embodiment, the task assignment module 140 includes a set of schedulers, including but not limited to one or more of the following: a Symmetric Multiprocessing (SMP) scheduler, an Asymmetric Multiprocessing (AMP) scheduler, a Heterogeneous Multiprocessing (HMP) scheduler, a cross-cluster scheduler, an In-kernel Switcher (IKS) scheduler, etc. The functionalities of these schedulers will be described in detail later with reference to FIGS. 3-14. The management module 120 and the task assignment module 140 may be implemented by hardware, software, or a combination of both. In an embodiment where the management module 120 and the task assignment module 140 are implemented by software, the software may be stored in the system memory 130 or other non-transitory computer readable medium accessible by the multi-cluster system 100. The software may be executed by a centralized hardware unit or by the activated clusters or processor cores in the multi-cluster system 100.

A close-up view of Cluster(0), Cluster(1) and Cluster (2) is shown in the upper part of FIG. 1 as an example. In this example, the processor cores in each cluster are identical. However, in other embodiments, the processor cores in each cluster can be different. In this example, Cluster(0) includes four processor cores (e.g., four LLPs), Cluster(1) includes four processor cores (e.g., four LPs), and Cluster(2) includes four processor cores (e.g., four BPs). It is understood that each cluster may include any number of processor cores, and different clusters may have different numbers of processor cores. Processor cores may have different extents of similarity or dissimilarity between different clusters. In addition, processor cores in some cluster pairs may have energy efficiency characteristics more similar to or more different from processor cores in some other cluster pairs. In one embodiment, the LP and LLP have the same or similar computation performance; that is, their differences in their MIPS are negligible. However, energy efficiency characteristics of the LP and LLP, when measured at the same temperature, are different from each other. The BP has different computation performance and different energy efficiency characteristics from the LP and LLP. For example, the BP may have higher computation performance and much higher power consumption than the LP and LLP. The other clusters in FIG. 1 may also have different energy efficiency characteristics from LP, LLP and BP. The energy efficiency characteristics of different processor cores are described below with reference to FIGS. 2A and 2B.

Figure 2A:
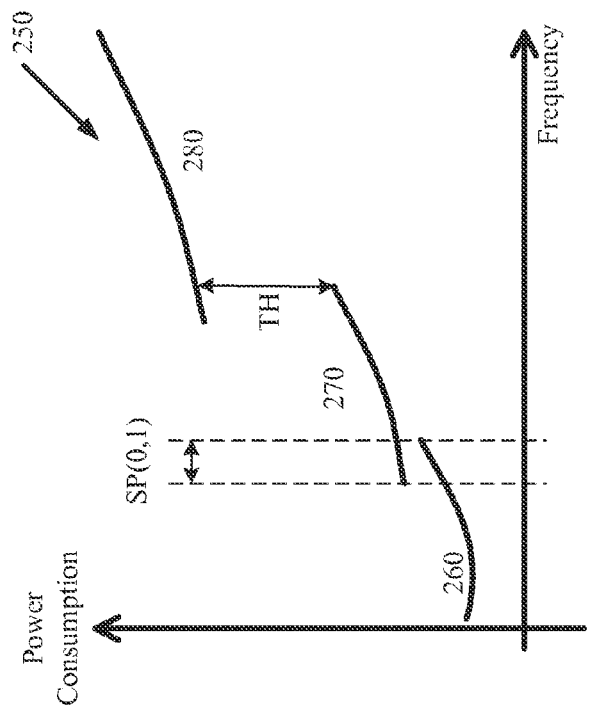
FIG. 2A illustrates a diagram of power consumption vs. frequency according to one embodiment.

FIG. 2A is a diagram 200 illustrating power consumption (which is the inverse of energy efficiency) vs. frequency according to one embodiment. Diagram 200 includes three energy efficiency characteristic curves 210, 220 and 230, representing the peak performance frequency ranges of the processor cores in Cluster(0), Cluster(1) and Cluster(2), respectively. Diagram 200 shows that Cluster(0) is most energy efficient in the low frequency range, Cluster(1) is most energy efficient in the mid-frequency range, and Cluster(2) is most energy efficient in the high frequency range. Diagram 200 also shows that curve 210 intersects curve 220, but curve 220 does not intersect curve 230. The region of intersection SP(0,1) is called the sweet-spot frequency range, or simply as the sweet spot or frequency spot. A sweet spot SP(i,j) represents an upper boundary area for the peak performance frequency range of Cluster(i), and a lower boundary area for the peak performance frequency range of Cluster(j). These boundary areas are not hard limits on the operating frequency; e.g., Cluster(0) may also operate in the frequencies above SP(0,1), and Cluster(1) may also operate in the frequencies below SP(0,1). The boundary area merely indicates whether a cluster operates within a frequency range that is energy efficient for that cluster. Each sweet spot is associated with two clusters; e.g., SP(0,1) is associated with Cluster(0) and Cluster(1). On one side of a given sweet spot, the energy efficiency of each processor core in one cluster is higher than each processor core in the other cluster; on the other side of the same given sweet spot, the energy efficiency of each processor core in the other cluster is higher than each processor core in the one cluster. For example, on the right side of SP(0,1), the energy efficiency of each processor core in Cluster(1) is higher than each processor core in the Cluster(0); on the left side of SP(0,1), the energy efficiency of each processor core in Cluster(0) is higher than each processor core in Cluster(1). In some embodiments, a cluster may be associated with more than two sweet spots, some of which may be located at one end of its peak performance frequency range and the others may be located at the other end of its peak performance frequency range.

In this example, the energy efficiency characteristic curve 230 is at least a threshold (TH) distance away from curve 220 with respect to the distance along the power consumption (vertical) axis. This indicates that Cluster(2) is more power consuming than Cluster(1). Curves 220 and 230 define no frequency spots associated with Cluster(1) and Cluster(2). Thus, in one embodiment, Cluster(2) may be placed in a different processor group (e.g., a different level-2 group) from Cluster(0) and Cluster(1).

Figure 2B:
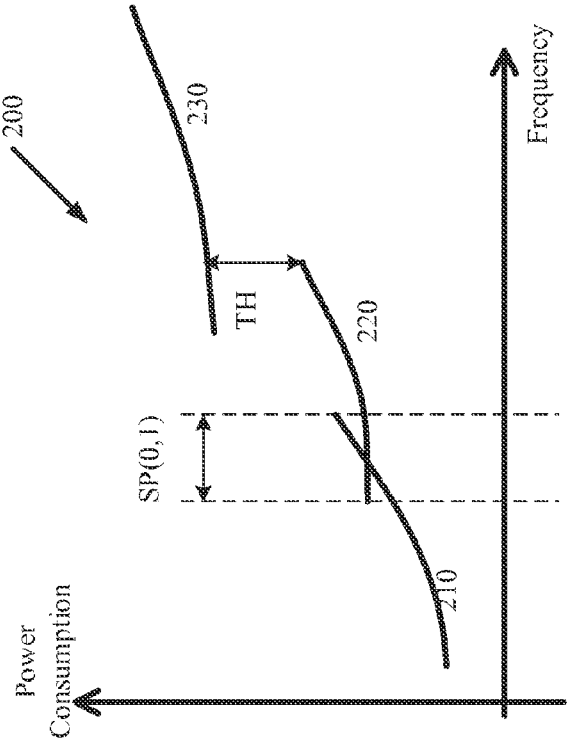
FIG. 2B illustrates a diagram of power consumption vs. frequency according to another embodiment.

FIG. 2B is another diagram 250 illustrating power consumption vs. frequency according to one embodiment. Similar to diagram 200, diagram 250 includes three energy efficiency characteristic curves 260, 270 and 280, representing the peak performance frequency ranges of the processor cores in Cluster(0), Cluster(1) and Cluster(2), respectively. However, diagram 250 differs from diagram 200 in that curves 260 and 270 do not cross each other, but are merely adjacent to each other (i.e., within a threshold distance). In diagram 250, SP(0,1) is a frequency range between the tail-end of one curve and the head-end of the next adjacent curve. Although the curves 260, 270 and 280 do not cross each other, the energy efficiency characteristics they represent are the same as described before in connection with diagram 200.

In this example, the energy efficiency characteristic curve 280 is at least a threshold (TH) distance away from curve 270 with respect to the distance along the power consumption axis. This indicates that Cluster(2) is more power consuming than Cluster(1). Curves 270 and 280 define no frequency spots associated with Cluster(1) and Cluster(2). Thus, in one embodiment, Cluster(2) may be placed in a different processor group (e.g., a different level-2 group) from Cluster(0) and Cluster(1).

Although only three clusters are shown in FIGS. 2A and 2B, it is understood that the aforementioned characteristics are extendable to any number of clusters. Moreover, different clusters may exhibit different characteristics represented by different curves. Some of the adjacent curves may cross each other, some of the adjacent curves may have overlapping regions, and some of the adjacent curves may have no overlapping region at all. These curves, as well as the sweet spots, may be determined from test results and experiments.

Embodiments of the invention provide a system and method for managing power and performance in a multi-cluster system that includes multiple processor cores in a hierarchy of groups. At the bottom of the hierarchy are level-1 groups (a.k.a. clusters). Above level-1 groups in the hierarchy are one or more level-2 groups, and above the one or more level-2 groups is a level-3 group. Analogous to a tree structure, the level-3 group is located at the root level of the hierarchy, the one or more level-2 groups are located at an internal level of the hierarchy, and the level-1 group is located at the leaf level of the hierarchy. In one embodiment, the hierarchy may include one internal level. In another embodiment, the hierarchy may include no internal level (i.e., no level-2 groups). In yet another embodiment, the hierarchy may include multiple internal levels, each internal level including one or more level-2 groups.

As described above, processor cores in different clusters may have different similarity in energy efficiency characteristics. The same type of processor cores can have identical energy efficiency characteristics and may be arranged in the same cluster. Two clusters of processor cores having higher similarity in energy efficiency characteristics can have different but interacting or close/adjacent energy efficiency characteristics curves. Two clusters of processor cores having lower similarity in energy efficiency characteristics can have different and non-intersecting or more distant energy efficiency characteristics curves. As will be shown in other embodiments to be described below, clusters with higher similarity in energy efficiency characteristics may be arranged in a lower-level group in a hierarchy of groups, and conversely, clusters with lower similarity in energy efficiency characteristics can be arranged in a higher-level group in the hierarchy of groups.

For example, each lowest level group, i.e., level-1 group may include clusters having highest similarity in power efficiency characteristics (e.g., identical power efficiency characteristics), meaning that that a level-1 group may include one or more the same type of processor cores. In some embodiments, a level-1 group may include one or more LP clusters, another level-1 group may include one or more LLP clusters, and/or yet another level-1 group may include one or more BP clusters.

Moreover, each second lowest level group, i.e., level-2 group may include clusters having similarity in power efficiency characteristics lower than that in each level-1 group (e.g., different but intersecting (or close or adjacent) power efficiency characteristics curves), meaning that that a level-2 group may include more than two types of processor cores with similar power efficiency characteristics. In some embodiments, a level-2 group may include one or more first level-1 groups each including one or more LP clusters and one or more second level-1 groups each may include one or more LLP clusters. In addition, another level-2 group may include one or more first level-1 groups each may include one or more BP clusters, and alternatively or additionally, one or more second level-1 groups each may include one or more clusters which, compared to the LP and LLP clusters, can have power efficiency characteristics more similar to the BP clusters.

Moreover, each third lowest level group, i.e., level-3 group may include clusters having similarity in power efficiency characteristics lower than that in each level-1 group and level-2 group (e.g., more different and non-intersecting or more distant efficiency characteristics curves), meaning that that a level-2 group may include more than two types of processor cores with much more dissimilar power efficiency characteristics compared to level-2 group. In some embodiments, a level-3 group may include a first level-2 group which may include one or more first level-1 groups each including one or more LP clusters and one or more second level-1 groups each may include one or more LLP clusters, and a second level-2 group which may include one or more first level-1 groups each may include one or more BP clusters, and alternatively or additionally, one or more other level-1 groups each may include another type of clusters, which compared to LP and LLP clusters, have power efficiency characteristics more similar to BP clusters.

Figure 3:
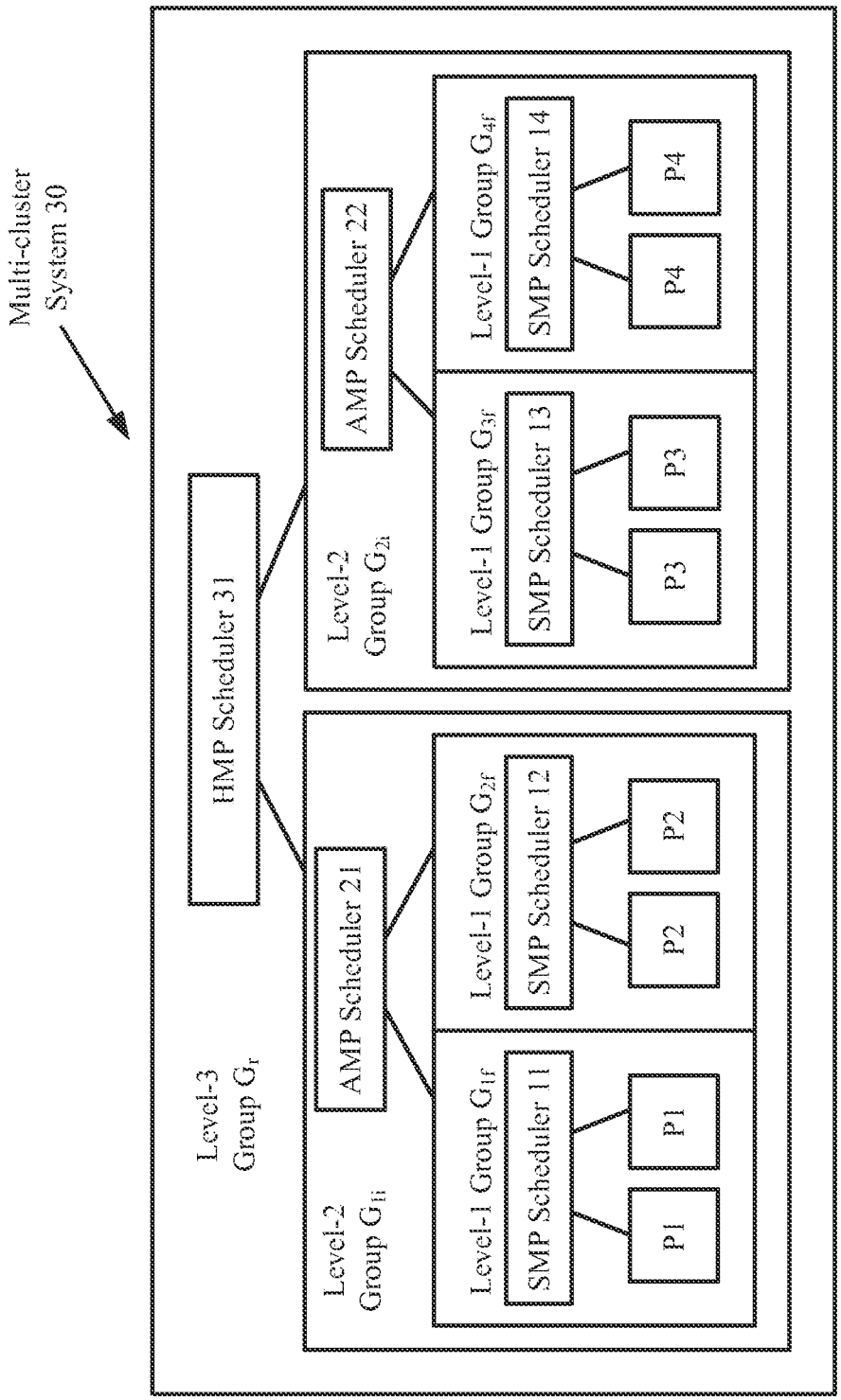
FIG. 3 illustrates an example of a multi-cluster system in a hierarchy of groups according to one embodiment.

FIG. 3 illustrates an example of a multi-cluster system 30 in a hierarchy of groups according to one embodiment. The hierarchy may be formed by some of the clusters and processor cores in FIG. 1, and some of these clusters and processor cores may have the energy efficiency characteristic curves shown in FIGS. 2A and 2B. In this example, the hierarchy includes four level-1 groups. Each level-1 group is a cluster that includes two identical processor cores having identical energy efficiency characteristics. The hierarchy further includes two level-2 groups, each level-2 group including two level-1 groups. The hierarchy further includes a level-3 group that includes the two level-2 groups.

More specifically, in the example of FIG. 1 the system 30 includes level-1 groups $G_{1f}$, $G_{2f}$, $G_{3f}$ and $G_{4f}$ (where the subscript "f" stands for "leaf"), level-2 groups $G_{1i}$ and $G_{2i}$ (where the subscript "i" stands for "internal"), and a level-3 group $G_r$ (where the subscript "r" stands for "root"). Although FIG. 3 shows a specific number of processor cores and a specific number of groups in each level of the hierarchy, it is understood that the system 30 may include any number of processor cores in each level-1 group, any number of level-1 groups in each level-2 group, and any number of level-2 groups in the level-3 group.

In this embodiment, each processor core in the same level-1 group has identical energy efficiency characteristics. The processor cores in different level-1 groups of the same level-2 group have different energy efficiency characteristics. Moreover, processor cores in different level-1 groups of the same level-2 group (e.g., P11 and P22) have more similar energy efficiency characteristics than processor cores in different level-2 groups (e.g., P11 and P33). For example, the energy efficiency characteristic curves of $G_{1f}$, $G_{2f}$ and $G_{3f}$ may be represented by curves 210, 220 and 230, respectively, or curves 260, 270 and 280, respectively, in FIGS. 2A and 2B. As curves 210 and 220 (or curves 260 and 270) are much closer in proximity with respect to the distance along the power consumption axis than curves 220 and 230 (or curves 270 and 280), $G_{1f}$ and $G_{2f}$ may be placed in the same level-2 group and $G_{3f}$ may be placed in another level-2 group. That is, when the distance between two curves is greater than a threshold (TH in FIGS. 2A and 2B), the two corresponding level-1 groups may be placed into different level-2 groups. Thus, any two processor cores of different level-1 groups in a same level-2 group have closer energy efficiency characteristic curves than any two processor core of different level-1 groups in different level-2 groups. In some embodiments, processor cores in different level-2 groups may have not only different energy efficiency characteristics but also different computation performance (e.g., when their difference in MIPS is greater than a threshold).

In one embodiment, the one or more processors in each level-1 group form a Symmetric Multiprocessing (SMP) architecture; that is, each level-1 group has an SMP architecture. The one or more level-1 groups in a level-2 group form an Asymmetric Multiprocessing (AMP) architecture; that is, each level-2 group has an AMP architecture. The one or more level-2 groups in the level-3 group form a Heterogeneous Multiprocessing (HMP) architecture; that is, the level-3 group has an HMP architecture. An SMP architecture may include a pool of homogeneous processors running independently. In a processor group having an SMP architecture, two or more identical processor cores may be connected to a shared system memory, have access to the same I/O devices, and are controlled by a single operating system instance that treats these processor cores equally. Each processor core may have the same access latency to the shared memory space. In an AMP architecture, not all processor cores are treated equally. A processor group having an AMP architecture may include two or more different types of processor cores that have different energy efficiency characteristics and substantially the same computation performance. A processor group having an HMP architecture may include two or more different types of processor cores that have different computation performance, different energy efficiency characteristics, and different access latencies to the system memory. These different processor cores may share the same memory space, or may be allocated with different portions of the memory space.

In one embodiment, each of the level-1 groups has an SMP architecture that uses a respective SMP scheduler to assign tasks to the processor cores in that level-1 group. An SMP scheduler schedules multiple tasks on a processor core, and also optimizes task assignments across multiple processor cores in a same level-1 group to achieve at least load balance among the processor cores in the same level-1 group. For example, SMP schedulers 11, 12, 13 and 14 assign tasks to the processor cores in the level-1 groups $G_{1f}$, $G_{2f}$, $G_{3f}$ and $G_{4f}$, respectively.

Furthermore, each of the level-2 groups ($G_{1i}$ and $G_{2i}$) has an AMP architecture that uses an AMP scheduler to assign tasks to the processor cores in the level-1 groups of that level-2 group. For example, a first AMP scheduler 21 assigns tasks to the processor cores in the level-1 groups $G_{1f}$ and $G_{2f}$, and a second AMP scheduler 22 assigns tasks to the processor cores in the level-1 groups $G_{3f}$ and $G_{4f}$. Each AMP scheduler 21, 22 schedules tasks to the different processor cores, taking into account in the scheduling at least the energy efficient characteristics of the different processor cores in different level-1 groups in a same level-1 group. Each AMP scheduler 21, 22 may assign tasks to the processor cores of all of its level-1 groups simultaneously when necessitated by the system workload. Further details of the AMP scheduling will be provided in detail with reference to FIGS. 7-14. More detailed can be also referred to the U.S. patent application Ser. No. 14/931,923.

In addition, the level-3 group $G_r$ has an HMP architecture that uses an HMP scheduler 31 to assign tasks to the level-2 groups $G_{1i}$ and $G_{2i}$. The HMP scheduler 31 can optimize task assignments across multiple processor cores in an HMP architecture, taking into account in the scheduling at least the different computation performance of the different processor cores in different level-2 groups in a same level-3 group. The HMP scheduler 31 may assign tasks to the processor cores in both level-2 groups $G_{1i}$ and $G_{2i}$ simultaneously when necessitated by the system workload.

In one embodiment, load balance can be first performed by each of the level-1 groups $G_{1f}$ and $G_{2f}$. For example, within the level-1 group $G_{1f}$, load balance can be performed according to a first predetermined timing. In addition, the load balance can be performed by the scheduler SMP 11 with respect to a specific processor core in $G_{1f}$ to balance its load among the processor cores in the same level-1 group $G_{1f}$. Afterwards, load balance can be further performed within the level-2 group $G_{1i}$ to which $G_{1f}$ belongs according to a second predetermined timing. The load balance can be performed by the scheduler AMP 21 with respect to the same specific processor core to balance its loading among the processor cores in the same level-2 group $G_{1i}$. And afterwards, load balance can be further performed within the level-3 group $G_r$ to which $G_{1f}$ belongs according to a third predetermined timing. The load balance can be performed by the scheduler HMP 31 with respect to the same specific processor core to balance its loading among the processor cores in the same level-3 group $G_r$. A similar operational flow can be performed with respect to the other level-1 group $G_{2f}$ by the scheduler 12, and then the level-2 group $G_{1i}$ by the scheduler 21, and then the level-3 group $G_r$ by the scheduler 31. Furthermore, a similar flow can be performed with respect to each of the other level-1 groups $G_{3f}$ and $G_{4f}$, respectively, by the respective schedulers 13 and 14. And the load balance within each of the level-1 groups $G_{3f}$ and $G_{4f}$ can be respectively followed by load balance within the level-2 group $G_{2i}$ by the scheduler 22, and then each respectively followed by load balance within the level-3 group $G_r$ by the scheduler 31.

In one embodiment, in each level-2 group, the energy efficiency characteristic curve of each level-1 group defines at least one predetermined frequency spot crossing or adjacent to (i.e., within a threshold distance) at least one other level-1 group in the same level-2 group. Additionally, in each level-2 group, the energy efficiency characteristic curve of each level-1 group is at least a threshold distance away from the energy efficiency characteristic curve of each level-1 group in a different level-2 group (e.g., curves 220 and 230 of FIG. 2A, or curves 270 and 280 of FIG. 2B). Any two processor cores of different level-1 groups in a same level-2 group have closer energy efficiency characteristic curves than any two processor core of different level-1 groups in different level-2 groups.

In one embodiment, after each of the level-1 schedulers (11, 12, 13 and 14) performs load balance between the processor cores in the corresponding level-1 group, each of the level-2 schedulers (21 and 22) performs load balance between the processor cores in the corresponding level-2 group, and then the level-3 scheduler 31 performs load balance between the processor cores in the level-3 group.

Figure 4:
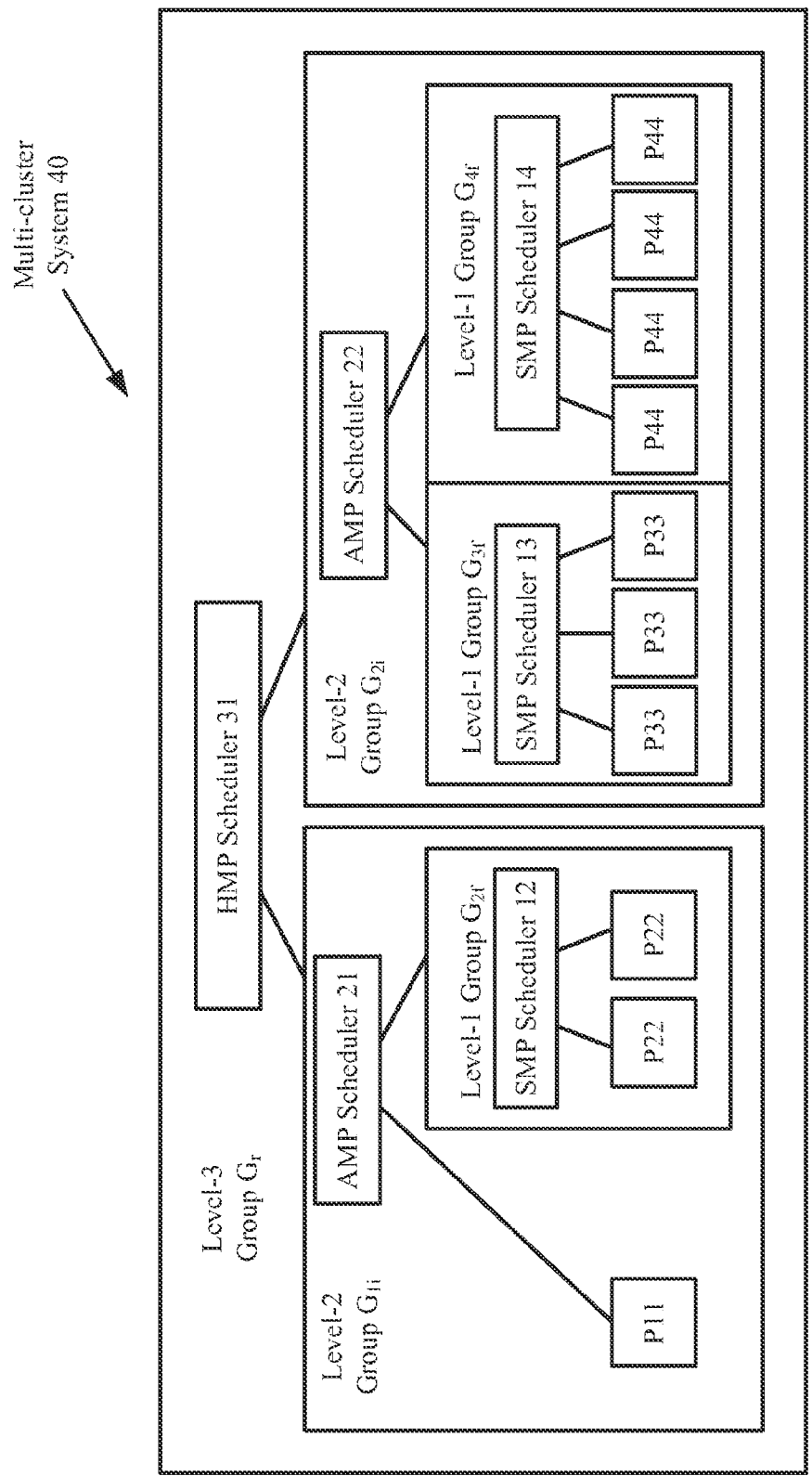
FIG. 4 illustrates an example of a multi-cluster system in a hierarchy of groups according to another embodiment.

FIG. 4 illustrates an example of a multi-cluster system 40 in a hierarchy of groups according to one embodiment. The hierarchy may be formed by some of the clusters and processor cores in FIG. 1, and some of these clusters and processor cores may have the energy efficiency characteristic curves shown in FIGS. 2A and 2B. This example is a special case of FIG. 3, where the level-1 group $G_{1f}$ of FIG. 3 includes, or is replaced with, a single processor core P11. The single processor core P11 does not belong to any level-1 group and is not subject to SMP scheduling. This example also illustrates that each level-1 group may include different numbers of processor cores: two processor cores in $G_{2f}$, three in $G_{3f}$ and four in $G_{4f}$. Task scheduling at each level of the hierarchy is the same as FIG. 3, except that the AMP scheduler 21 in this case can directly assign tasks to both processor core P11 and the processor cores in the level-1 group $G_{2f}$. It is also noted that in the embodiments, the scheduler 21 assigns tasks to the processor cores in the level-1 group $G_{2f}$ but the disclosure is not limited thereto. In other embodiments, the scheduler 21 can assigns tasks to the level-1 group $G_{2f}$, and an assistance module may assign tasks to the processor cores in the level-1 group $G_{2f}$. The assistance module may be integrated with or separate from the scheduler 21.

Figure 5:
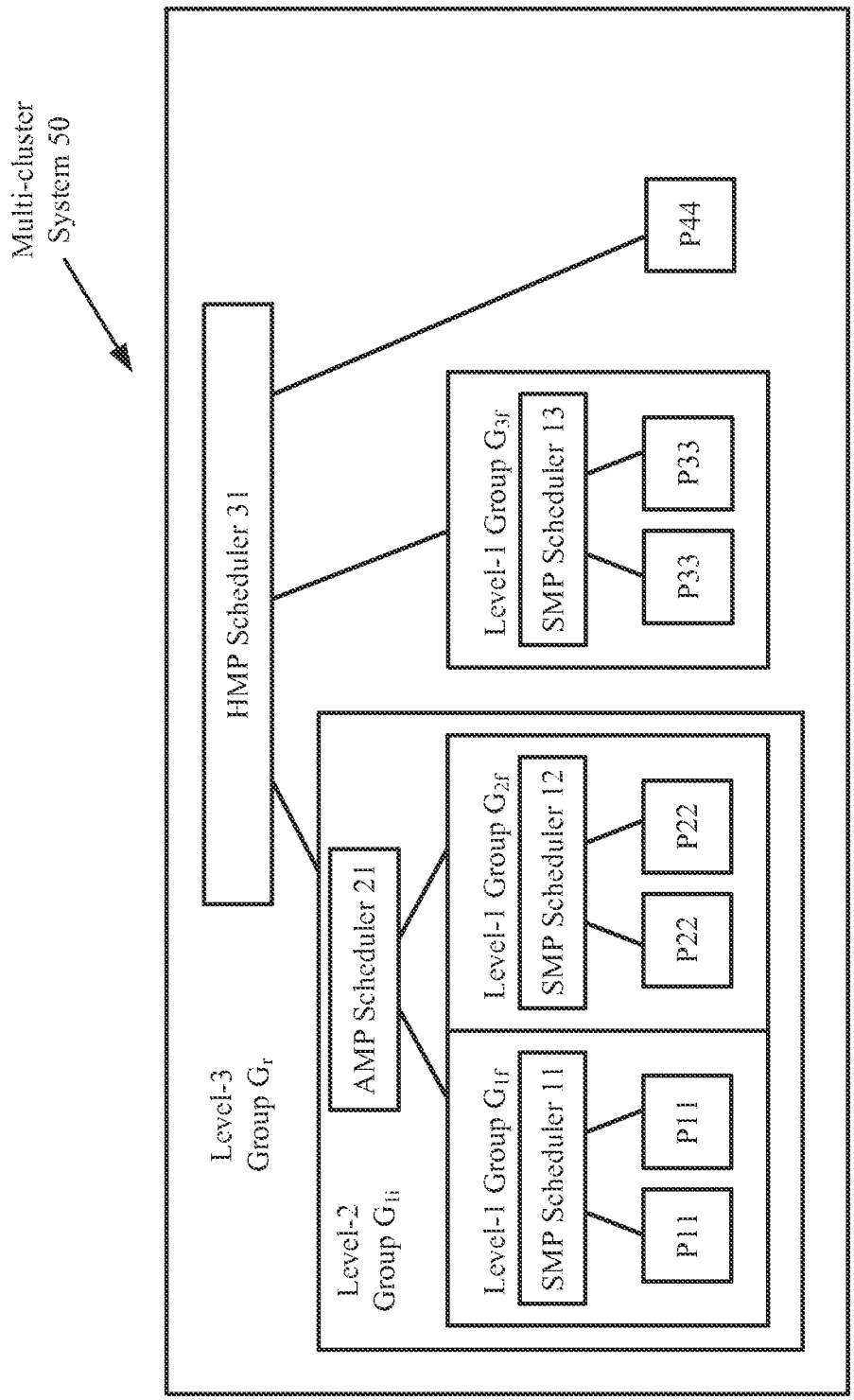
FIG. 5 illustrates an example of a multi-cluster system in a hierarchy of groups according to yet another embodiment.

FIG. 5 illustrates yet another example of a multi-cluster system 50 in a hierarchy of groups according to one embodiment. The hierarchy may be formed by some of the clusters and processor cores in FIG. 1, and some of these clusters and processor cores may have the energy efficiency characteristic curves shown in FIGS. 2A and 2B. In this example, directly under the level-3 group $G_r$ are the level-2 group $G_{1i}$, the level-1 group $G_{3f}$ and the processor core P44. That is, the level-1 group $G_{3f}$ and the processor core P44 do not belong to any level-2 groups. This examples also illustrates that the HMP scheduler 31 can directly assign tasks to the level-2 group $G_{1i}$, the level-1 group $G_{3f}$ and the processor core P44.

Figure 6A:
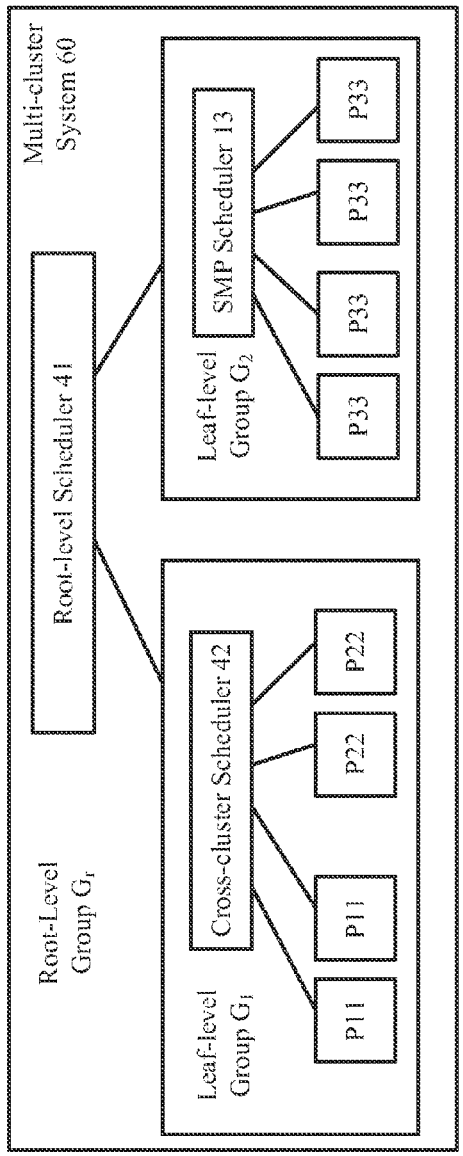
FIG. 6A illustrates an example of a multi-cluster system in a two-level hierarchy according to one embodiment.

FIG. 6A illustrates an example of a multi-cluster system 60 in a two-level hierarchy according to one embodiment. The hierarchy may be formed by some of the clusters and processor cores in FIG. 1, and some of these clusters and processor cores may have the energy efficiency characteristic curves shown in FIGS. 2A and 2B. In this example, the hierarchy of groups contains two levels only: the root level and the leaf level. To avoid confusion with the embodiments described in FIGS. 3-5, the two levels of groups are referred to as the leaf-level groups and the root-level group. The root-level group $G_r$ has an HMP architecture and uses a root-level scheduler 41 to assign tasks to the leaf-level groups. Directly under the root-level group $G_r$ are the leaf-level group $G_1$ and the leaf-level group $G_2$. Processor cores within the same leaf-level group may or may not be identical. In this embodiment, the leaf-level group $G_2$ includes identical processor cores and uses the SMP scheduler 13 to assign tasks to the processor cores. The leaf-level group $G_1$ uses a cross-cluster scheduler 42 to assign tasks to processor cores in the leaf-level group $G_1$, or the leaf-level group $G_1$ that includes processor cores of different energy efficiency characteristics, and difference in their energy efficiency characteristic curves (as represented by curves such as curves 210 and 220, or curves 260 and 270 of FIGS. 2A and 2B) is within a threshold. Within the leaf-level group $G_1$, interrupts may be handled by a fixed processor core. Furthermore, at least one processor core of the leaf-level group $G_1$ is online (i.e., activated). In one embodiment, the cross-cluster scheduler 42 is implemented as an AMP scheduler but the disclosure is not limited thereto. Any scheduler that handles dissimilarity between the processor cores in different clusters can be implemented. In addition, in alternative embodiments, the leaf-level group $G_1$ includes a single cluster comprising different types of processor cores or processor cores with different but adjacent energy efficiency characteristics. In such embodiments, the cross-cluster scheduler 42 is replaced by a scheduler for assigning tasks to processor cores in the single cluster.

In the two-level embodiment shown in FIG. 6A, any two processor cores of the same leaf-level group (e.g., $G_1$ or $G_2$) have closer energy efficiency characteristic curves than any two processor core of different leaf-level groups. Moreover, in at least one of the leaf-level groups (e.g., $G_1$), the energy efficiency characteristic curve of each processor core defines at least one predetermined frequency spot crossing or adjacent to at least one other processor core in the same leaf-level group. In addition, in each of the leaf-level groups, the energy efficiency characteristic curve of each processor core is at least a threshold distance away from the energy efficiency characteristic curve of each processor core in a different leaf-level group.

In the embodiment of FIG. 6A, the root-level scheduler 41 may be an HMP scheduler. In another embodiment, the root-level scheduler 41 may be an IKS scheduler. An IKS scheduler assigns tasks to pairs of processor cores. For example, each pair may include processor cores P11 and P33, or P22 and P33; i.e., two processor cores of different energy efficiency characteristics and different computation performance. With the IKS scheduling, only one processor core in a pair is activated.

Figure 6B:
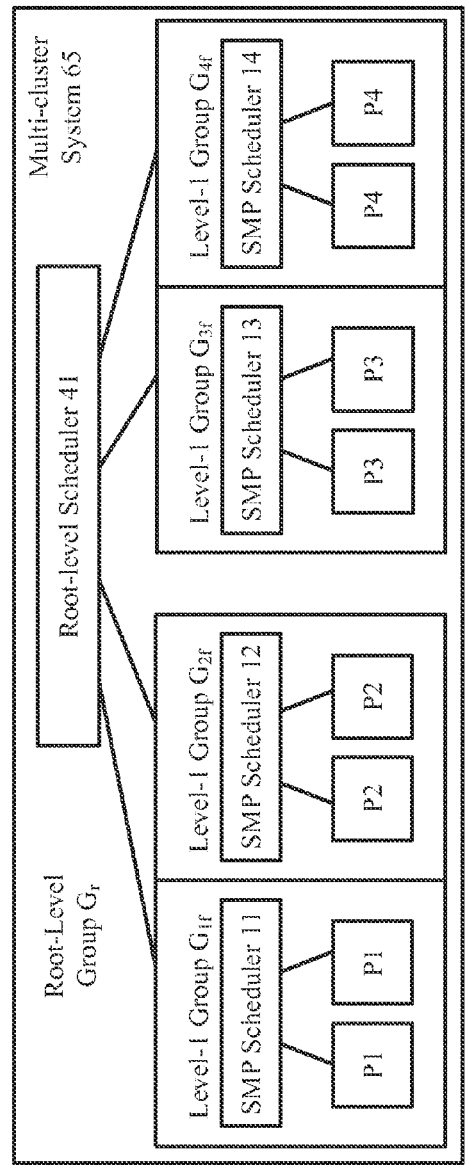
FIG. 6B illustrates an example of a multi-cluster system in a two-level hierarchy according to another embodiment.

FIG. 6B illustrates an example of a multi-cluster system 65 in a two-level hierarchy according to another embodiment. The hierarchy may be formed by some of the clusters and processor cores in FIG. 1, and some of these clusters and processor cores may have the energy efficiency characteristic curves shown in FIGS. 2A and 2B. In this example, the root-level group $G_r$ has an HMP architecture and uses a root-level scheduler 41 to assign tasks to the leaf-level groups or the processor cores therein. Directly under the root-level group $G_r$ are the leaf-level groups $G_{1f}$, $G_{2f}$, $G_{3f}$ and $G_{4f}$. Each of the leaf-level groups includes identical processor cores and uses the SMP schedulers 11, 12, 13 and 14 to assign tasks to the leaf-level groups or the processor cores therein. The root-level scheduler 41 may be an HMP scheduler or an IKS scheduler.

In yet another alternative embodiment, the hierarchy of groups may include more than three levels; e.g., a leaf level having the SMP architecture, multiple interval levels having the AMP architecture, and a root level having the HMP architecture. Similar to the three-level example of FIG. 3, the root level uses the HMP scheduler 31 to assign tasks to the interval level directly under the root level (specifically, assign tasks to the interval level group or processor cores therein), and each interval level uses an AMP scheduler (e.g., the AMP scheduler 21 or 22) to assign tasks to the level directly under it (specifically, assign tasks to the group at the level or processor cores therein). The leaf level uses an SMP scheduler (e.g., the SMP scheduler 11, 12, 13 or 14) to assign tasks to the processor cores in each leaf-level group or the level-1 group.

Furthermore, in any of the embodiments described above, a scheduler may assign heavy (e.g., when the number of threads or tasks exceeds a threshold) or urgent (e.g., when allowable delay or latency is less than a threshold) tasks to one processor group or processor cores therein having higher computation performance, and light or non-urgent (which is opposite to heavy or urgent) tasks to another processor group that has lower computation performance. Using the example of FIG. 3, assume that the computation performance of P33 (in $G_{3f}$) are higher than that of P11 and P12 (in $G_{1f}$ and $G_{2f}$, respectively). When the system 30 receives heavy or urgent tasks and the level-1 group $G_{3f}$ is not activated, the system 30 may activate or more processor cores in $G_{3f}$ according to the number of heavy tasks and urgent tasks, or the total loading of heavy tasks and urgent tasks. The system 30 may use multiple levels of schedulers mentioned above to assign tasks to the activated processor groups or processor cores therein in the system 30. Low-to-middle performance demands can be satisfied by AMP scheduling at the internal level(s) of the hierarchy, and high or instant performance demands can be satisfied by HMP scheduling at the root level of the hierarchy. Within each level-1 group, SMP scheduling balances the loading among the processor cores.

Due to the hierarchy of architecture, processor cores may be scheduled, activated, assigned tasks or requests more efficiently. Different energy efficiency characteristics may be considered, for example, in the scheduling for the level-2 group. In an embodiment utilizing the AMP scheduler, interrupt requests can be flexibly arranged to be handled by different processor cores in different clusters. Accordingly, whether to deactivate unrequired processor cores can be further determined. Consequently, the overall system performance or power consumption can also be improved. Overall, energy efficiency of the system can be achieved.

The following description explains the aforementioned AMP architecture and AMP scheduling, using Cluster(0) and Cluster(1) of FIG. 1 as an example. In the following description, Cluster(0), Cluster(1) and the other clusters shown in FIG. 1 are all subject to AMP scheduling by an AMP scheduler.

Referring again to FIG. 1, the multi-cluster system 100 includes a first cluster (Cluster(0)) which is currently active and which further includes one or more first processor cores. When the multi-cluster system detects an event in which a current operating frequency of the first cluster (i.e., the active cluster) enters or crosses any of one or more predetermined frequency spots of the first cluster, the system 100 performs the following steps: (1) identifying a second cluster (i.e., the target cluster, such as Cluster(1)) that includes one or more second processor cores, each first processor cores in the first cluster and each second processor cores in the second cluster having different energy efficiency characteristics; (2) activating at least one second processor cores in the second cluster; (3) determining whether to migrate one or more interrupt requests from the first cluster to the second cluster; and (4) determining whether to deactivate at least one first processor core in the active cluster based on a performance and power requirement. In one embodiment, the second cluster is identified to be one of the clusters that is associated with the entered or crossed predetermined frequency spot. Furthermore, if the second cluster is already activated before step (2), the active state of the target cluster is maintained. If the second cluster is not activated before step (2), the target cluster is switched to the active state (i.e., activated).

In one embodiment, the aforementioned event may be an indication that the first cluster is not operating with energy efficiency. In the multi-cluster system, the clusters can be associated with respective one or more predetermined frequency spots. The event is detected when the current operating frequency of the first cluster enters or crosses (i.e., passes through) a frequency spot, which is any of the one or more frequency spots of the first cluster. The respective one or more predetermined frequency spots can be determined based on respective energy efficiency characteristics of processor cores of the clusters. Each of these frequency spots can be a boundary area of the predetermined frequency range in which the first cluster operates with energy efficiency. The frequency range and frequency spots may be predetermined by the designer or manufacturer of the processor cores. Furthermore, in some embodiments, the system includes a voltage regulator to control the voltage supplied to the different processor cores of different processor types in the system. Having a single voltage regulator for the entire system can save hardware cost, compared to systems where each cluster, or each processor core, has its own voltage regulator. However, the disclosure is not limited to a single voltage regulator or multiple voltage regulators.

When the event is detected, the interrupt requests may migrate to another processor core in a second cluster. In some cases, when the event is detected, after the interrupt requests are migrated to another processor core in a second cluster, the first cluster may be deactivated. If the interrupt requests are migrated to the second cluster, depending on the system workload the system may or may not keep the first cluster activated. Thus, the system is not required to keep a fixed processor core or a fixed cluster operating all the time to handle interrupt requests. As a result, the system can operate more efficiently. The decisions as to whether to migrate the interrupt requests and whether to deactivate the first cluster may be dependent on a number of factors to be described in detail below.

In one embodiment, at least one of the aforementioned determinations of step (3) whether to migrate one or more interrupt requests from the first cluster to the second cluster; and step (4) whether to deactivate one or more currently active clusters of the clusters based on a performance and power requirement, is dependent on a comparison between a required number of active processor cores and the total number of active processor cores in the multi-cluster system. In other words, at least one of the determinations of step (3) and step (4) is performed according to the required number of active processor cores and the total number of active processor cores in the multi-cluster system.

In one embodiment, one factor for determining the required number of active processor cores or whether the active cluster is to be deactivated is the number of threads or tasks that need to be processed. An indicator, called hTLP, represents the number of threads or tasks with loading, where h represents loading and TLP represents "Thread Level Parallelism" or "Task Level Parallelism." The "loading" may be a percentage or ratio (e.g., 50%, 80%, 100%, etc.). The hTLP indicates the required number of active processor cores for processing a system workload. In one embodiment, the required number of active processor cores can be obtained or calculated from the number of threads or tasks with loading greater than a threshold, e.g., the number of threads or tasks that the system is required to process multiplied by the loading. The loading increases when system workload increases and the number of active cores stays the same. When the loading exceeds a predetermined threshold, more processor cores or more clusters may be activated to keep the loading below that threshold. In one embodiment, the determination of how many active processor cores and active clusters to have in the system depends on the value of hTLP.

In this example, all LLPs in Cluster(0) are activated and all LPs in Cluster(1) are de-activated. In addition, one of the LLPs is an interrupt-handling processor (shown as a white block with slanted lines). All of the other clusters Cluster(2), Cluster(3), . . . , Cluster(M) in this example are de-activated for simplicity of the description. However, it is understood that any of clusters may be active at any given time. As will be described later, when the operating frequency changes, another cluster (referred to as a "second cluster' or "target cluster") in the system 100 may be activated, and one or more of the processor cores in the second cluster may take over the interrupt handling role. Cluster(0) may stay activated or may be de-activated depending on whether the system 100 has sufficient active processor cores to handle the current or oncoming workload.

When migrating interrupt requests from one cluster to another in a system having more than two clusters, the migration may be direct or indirect. For example, the current operating frequency may increase from the peak frequency range of Cluster(0) to the peak frequency range of Cluster (2). However, the peak performance frequency range of Cluster(1), compared to the peak performance frequency range of Cluster(2), is closer to the peak performance frequency range of Cluster(0). The interrupt requests may migrate from Cluster (0) directly to one Cluster(2). Alternatively, interrupt requests may, at first, migrate from Cluster(0) to Cluster(1), and subsequent interrupt requests may migrate from Cluster(1) to Cluster(2).

Figure 7:
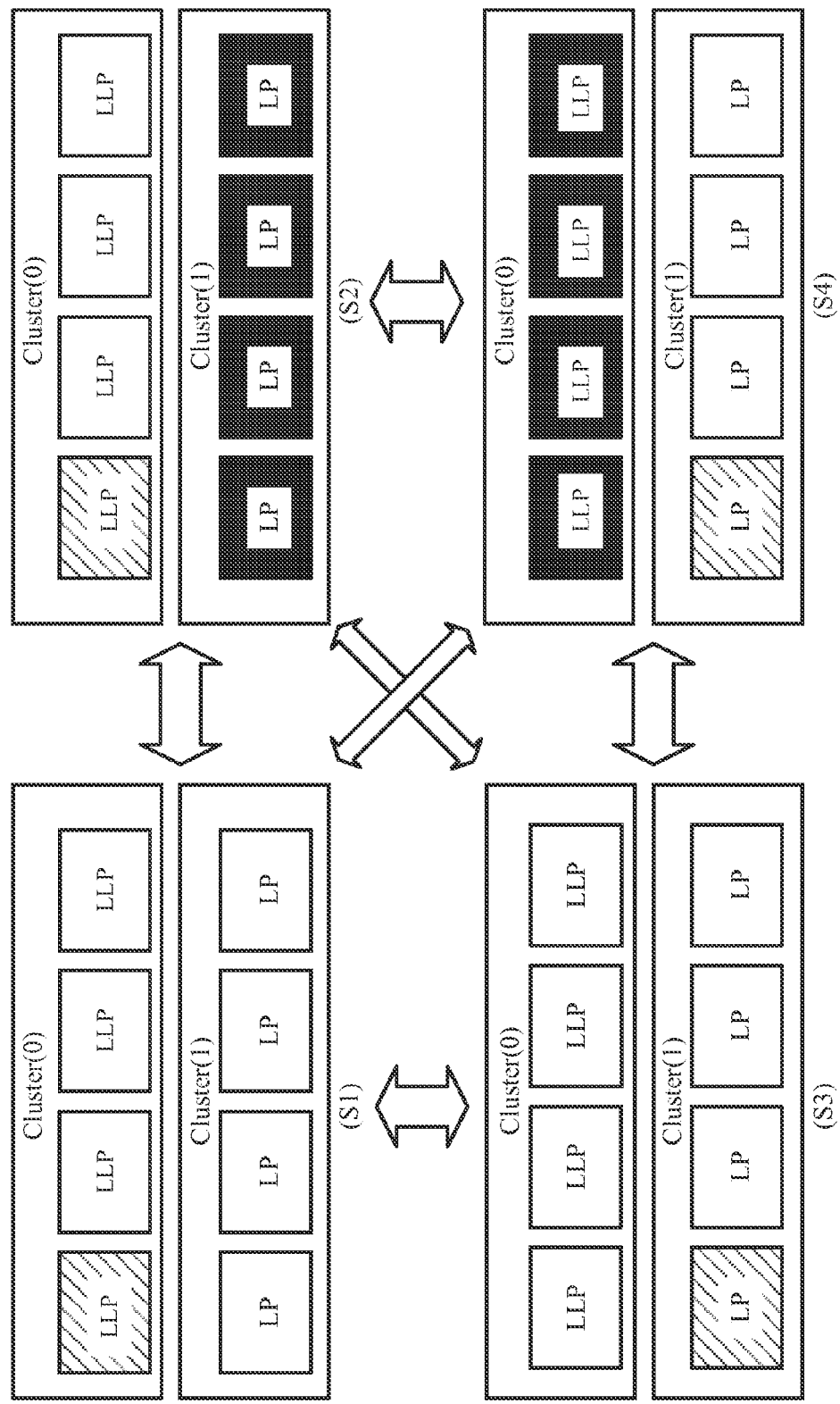
FIG. 7 illustrates transitions among four operating scenarios for two clusters according to one embodiment.

The following description, with reference to FIGS. 7-14, provides further details of AMP architecture and AMP scheduling. FIG. 7 illustrates the transitions of four operating scenarios for two clusters (e.g., Cluster(0) and Cluster (1)) according to one embodiment. Cluster(0) and Cluster(1) have the substantially the same computation performance and different energy efficiency characteristics; e.g., their energy efficiency curves may be the ones (e.g., curves 210 and 220, or curves 260 and 270) shown FIG. 2A or FIG. 2B. FIG. 7 illustrates four operating scenarios: (S1) and (S3) are high-performance scenarios in which both clusters are active, S(2) is a low-performance scenario in which only Cluster(0) is active, and (S4) is a mid-performance scenario in which only Cluster(1) is active. Each scenario may transition into any of the other scenarios. Both (S2) and (S4) operate under the condition that hTLP≤N, and both (S1) and (S3) operate under the condition that hTLP>N, where in this example N=4 (the total number of processor cores in a cluster).

In the following description, the "first cluster" refers to a cluster that is initially active. Thus, the first cluster is also referred to as an "active cluster." The "second cluster" refers to a cluster different from the first cluster. The second cluster is also referred to a "target cluster." In scenarios (e.g., (S1) and (S3)) where both clusters are initially active, the cluster that initially handles all interrupt requests are referred to as the first cluster. The transition between any two of the scenarios is triggered when the current operating frequency enters or crosses a frequency spot of the first cluster.

In (S2), only Cluster(0) is active and owns the interrupt-handling processor core (shown as the lined block) that handles all interrupt requests. When the current operating frequency enters SP(0,1) or crosses SP(0,1) from the frequency range of Cluster(0) into the frequency range of Cluster(1), the management module 120 activates Cluster (1), and determines whether to migrate interrupt requests to Cluster(1), and whether to deactivate Cluster(0). These determinations can be dictated by which operating scenario that the system is currently in and which operating scenario that the system is to enter. The system may transition from (S2) to (S4), in which all interrupt requests are migrated to a processor core (shown as the lined block in scenario (S4)) in Cluster(1), and Cluster(0) is deactivated. Similarly, if the system is initially in (S4), the system may transition from (S4) to (S2) when the current operating frequency enters SP(0,1), or crosses SP(0,1) from the frequency range of Cluster(1) into the frequency range of Cluster(0). Furthermore, all interrupt requests are migrated to a processor core in Cluster(0), and Cluster(1) can be deactivated.

In short, the transitions between (S2) and (S4) in either direction occurs under the conditions: when the second cluster was initially deactivated before the transition, and when the required number of active processor cores (i.e., hTLP) is lower than or equal to a total number of active processor cores in the first cluster. A transition between (S2) and (S4) in either direction means that the interrupt requests are migrated from the first cluster to the second cluster. Furthermore, a transition between (S2) and (S4) in either direction means that the second cluster is activated and the first cluster is deactivated after the transition.

In (S1) and (S3), both Cluster(0) and Cluster(1) are initially active. In (S1), Cluster(0) owns the interrupt-handling processor (shown as the lined block) that handles all interrupt requests. When the current operating frequency enters SP(0,1) or crosses SP(0,1) from the frequency range of Cluster(0) into the frequency range of Cluster(1), the management module 120 determines whether to migrate interrupt requests to Cluster(1), and whether to deactivate Cluster(0). These determinations are dictated by which operating scenario that the system is currently in and which operating scenario that the system is to enter. The system may transition from (S1) to (S3), in which all interrupt requests are migrated to a processor core (shown as the lined block in scenario (S3)) in Cluster(1). Similarly, the system may transition from (S3) to (S1) when the current operating frequency enters SP(0,1) or crosses SP(0,1) into the frequency range of Cluster(1) into the frequency range of Cluster(0). In the transition from (S3) to (S1), all interrupt requests are migrated to a processor core in Cluster(0).

In short, the transitions between (S1) and (S3) in either direction occurs under the conditions: when the second cluster was initially activated before the transition, and when the required number of active processor cores (i.e., hTLP) is greater than a total number of active processor cores in the first cluster. A transition between (S1) and (S3) in either direction means that the interrupt requests are migrated from the first cluster to the second cluster. Furthermore, a transition between (S1) and (S3) in either direction means that both the first and second clusters maintain their active states.

The system may also transition between the left side and right side of FIG. 7. For example, the transition from (S2) to (S1), as well as the transition from (S4) to (S3) occur under the conditions: when the second cluster was initially deactivated before the transition, and when the required number of active processor cores (i.e., hTLP) increases to be greater than a total number of active processor cores in the first cluster. After either of these transitions, the second cluster is activated and the interrupt requests are not migrated; i.e., handled by the same cluster as before the transition.

Furthermore, the transition from (S1) to (S2), as well as the transition from (S3) to (S4) occur under the conditions: when the second cluster was initially activated before the transition, and when the required number of active processor cores (i.e., hTLP) decreases to be lower than or equal to a total number of active processor cores in the first cluster. After either of two transitions, the second cluster is deactivated and the interrupt requests are handled by the same cluster as before the transition.

Although FIG. 7 and the subsequent figures show that only one processor core at a time handles interrupt requests, in some cases more than one processor cores may handle interrupt requests at the same time. Thus, in some embodiments, when activating the second cluster, the system identifies one or more target processor cores among the second processor cores in the second cluster and migrates the interrupt requests from the first cluster to the one or more target processor cores in the second cluster.

Figure 8:
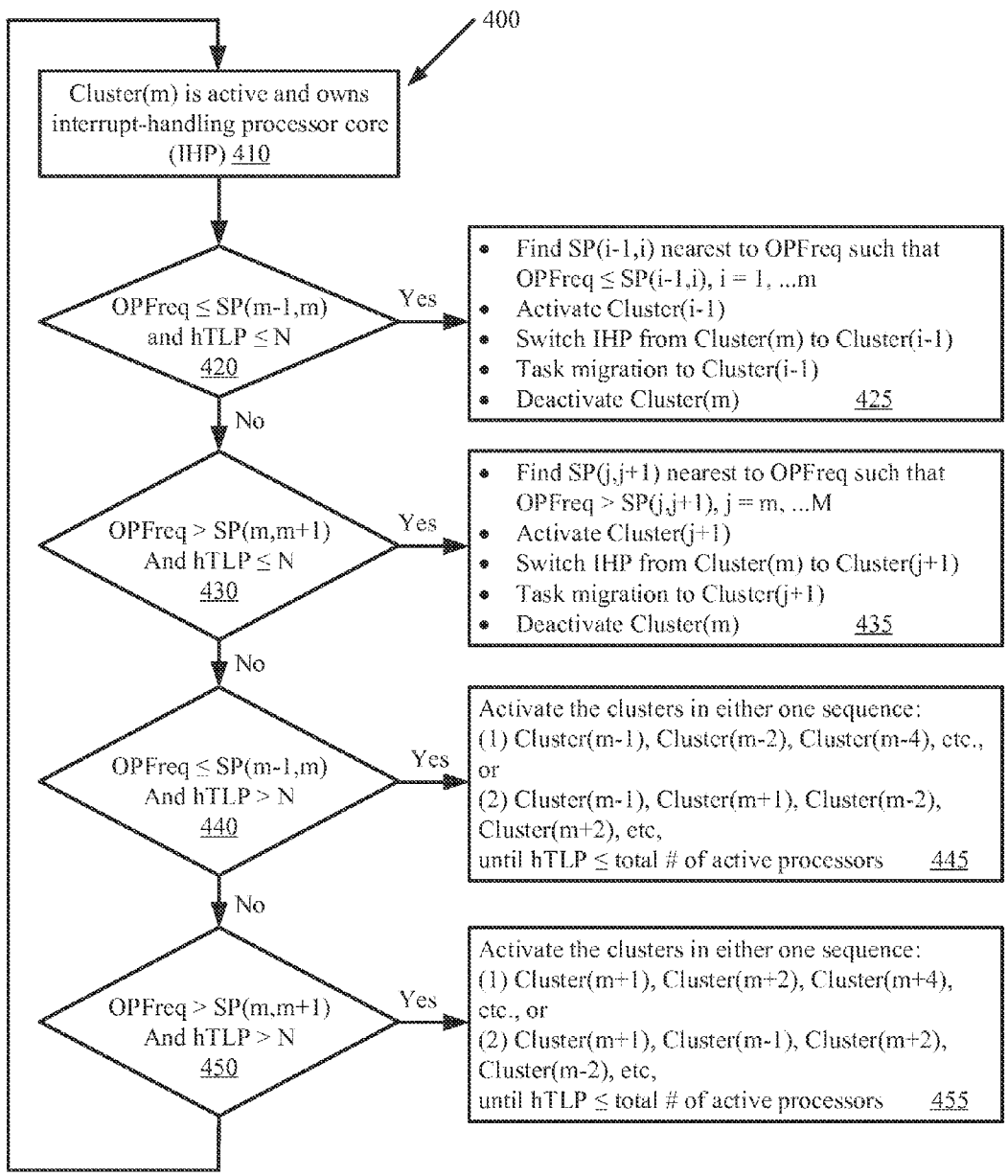
FIG. 8 is a flow diagram illustrating a method for efficiently operating a multi-cluster system according to one embodiment.

FIG. 8 is a flow diagram illustrating a method 400 for efficiently operating a level-2 group with AMP scheduling according to one embodiment. The method 400 is performed by the multi-cluster system 100; for example, the management module 120 of FIG. 1. In this example, it is assumed that the level-2 group includes (M+1) clusters, and it is assumed without loss generality that the (M+1) clusters, when ordered according to their respective peak performance frequency ranges from low to high in frequency, follow the order of Cluster(0)<Cluster(1)<Cluster(2)< . . . <Cluster(M). It is also assumed that, in this example, the system workload that can be efficiently handled by a single cluster (Cluster(m)) is when hTLP≤N (or equivalently, when the required number of active processor cores is less than or equal to N), where N is the number of processors in Cluster(m) and m is an integer index, 0≤m≤M.

Initially, at block 410 Cluster(m) is active and owns the interrupt-handling processor core (herein referred to as the IHP). Cluster (m) is associated with SP(m−1,m) and SP(m,m+1), which are the lower and upper boundaries of the predetermined frequency range of Cluster(m). For simplicity, the operating frequency is herein referred to as OPFreq. Moreover, the term "OPFreq≤SP(i,j)" or its equivalent means that the operating frequency is within frequency spot SP(i,j) or is lower than SP(i,j). In other words, the operating frequency has decreased and entered or crossed frequency spot SP(i,j). Similarly, "OPFreq>SP(i,j)" or its equivalent means that the operating frequency has increased and crossed frequency spot SP(i,j).

If the system 100 detects that OPFreq≤SP(m−1,m) and hTLP≤N, then the condition specified in block 420 is satisfied and the system proceeds to block 425 to find an SP(i−1,i) nearest to OPFreq such that OPFreq≤SP(i−1,i) where 1≤i≤m. The system 100 also activates Cluster(i−1), switches the IHP from Cluster(m) to Cluster(i−1), performs task migration to Cluster(i−1), and deactivate Cluster(m). If the condition specified in block 420 is not satisfied, the system proceeds to block 430.

At block 430, if the system 100 detects that OPFreq>SP(m,m+1) and hTLP≤N, then the condition specified in block 430 is satisfied and the system proceeds to block 435 to find SP(j,j+1) nearest to OPFreq such that OPFreq>SP(j,j+1), where m≤j≤M. The system 100 also activates Cluster(j+1), switches the IHP from Cluster(m) to Cluster(j+1), performs task migration to Cluster(j+1), and deactivate Cluster(m). If the condition specified in block 430 is not satisfied, the system proceeds to block 440.

Using the example of FIG. 7, the transition from block 410 to block 420 corresponds to the transition from (S4) to (S2), and the transition from block 410 to block 430 corresponds to the transition from (S2) to (S4).

At block 440, if the system 100 detects that OPFreq≤SP(m−1,m) and hTLP>N, then the condition specified in block 440 is satisfied and the system proceeds to block 445 to activate the clusters in either one of the sequences: (1) Cluster(m−1), Cluster(m−2), Cluster(m−3), etc., or (2) Cluster(m−1), Cluster(m+1), Cluster(m−2), Cluster(m+2), etc., until the active processor cores in the system 100 provide sufficient processing capabilities to support the system workload; in other words, until the total number of active processor cores is greater than or equal to the required number of active processor cores. In this case, Cluster(m) stays active. The IHP may stay in the same cluster (e.g., in Cluster(m)) as before the transition to block 445; an example of the transition is from (S4) to (S3) in FIG. 7. Alternatively, a processor core in another activated cluster may take on the role of IHP in the transition to block 445; an example of the transition is from (S4) to (S1) directly, or from (S4) to (S1) via (S3).

If the condition specified in block 440 is not satisfied, the system 100 proceeds to block 450. At block 450, if the system 100 detects that OPFreq>SP(m,m+1) and hTLP>N, then the condition specified in block 450 is satisfied and the system proceeds to block 455 to activate the clusters in either one of the sequences: (1) Cluster(m+1), Cluster(m+2), Cluster(m+3), etc., or (2) Cluster(m+1), Cluster(m−1), Cluster(m+2), Cluster(m−2), etc., until the active processor cores in the system 100 provide sufficient processing capabilities to support the system workload; in other words, until the total number of active processor cores is greater than or equal to the required number of active processor cores. In this case, Cluster(m) stays active. The IHP may stay in the same cluster (e.g., in Cluster(m)) as before the transition to block 455; an example of the transition is from (S2) to (S1) in FIG. 7. Alternatively, a processor core in another activated cluster may take on the role of IHP in the transition to block 455; an example of the transition is from (S2) to (S3) directly, or from (S2) to (S3) via (S4).

If the condition specified in block 450 is not satisfied, the system 100 may loop back to block 410. The method 400 may be repeated at a fixed interval, when a new operating event is detected, or when a change in the operating frequency or system workload is detected.

As shown in blocks 445 and 455, the system may activate more than one cluster when condition 440 or 450 is satisfied. In each of the activated cluster, the system may determine to activate all, or less than all, of the processor cores in that cluster. In one embodiment, the system may determine whether to activate or deactivate one or more processor cores in one or more clusters other than the active cluster and the target cluster. The determination may be made according to the required number of active processor cores.

Figure 9:
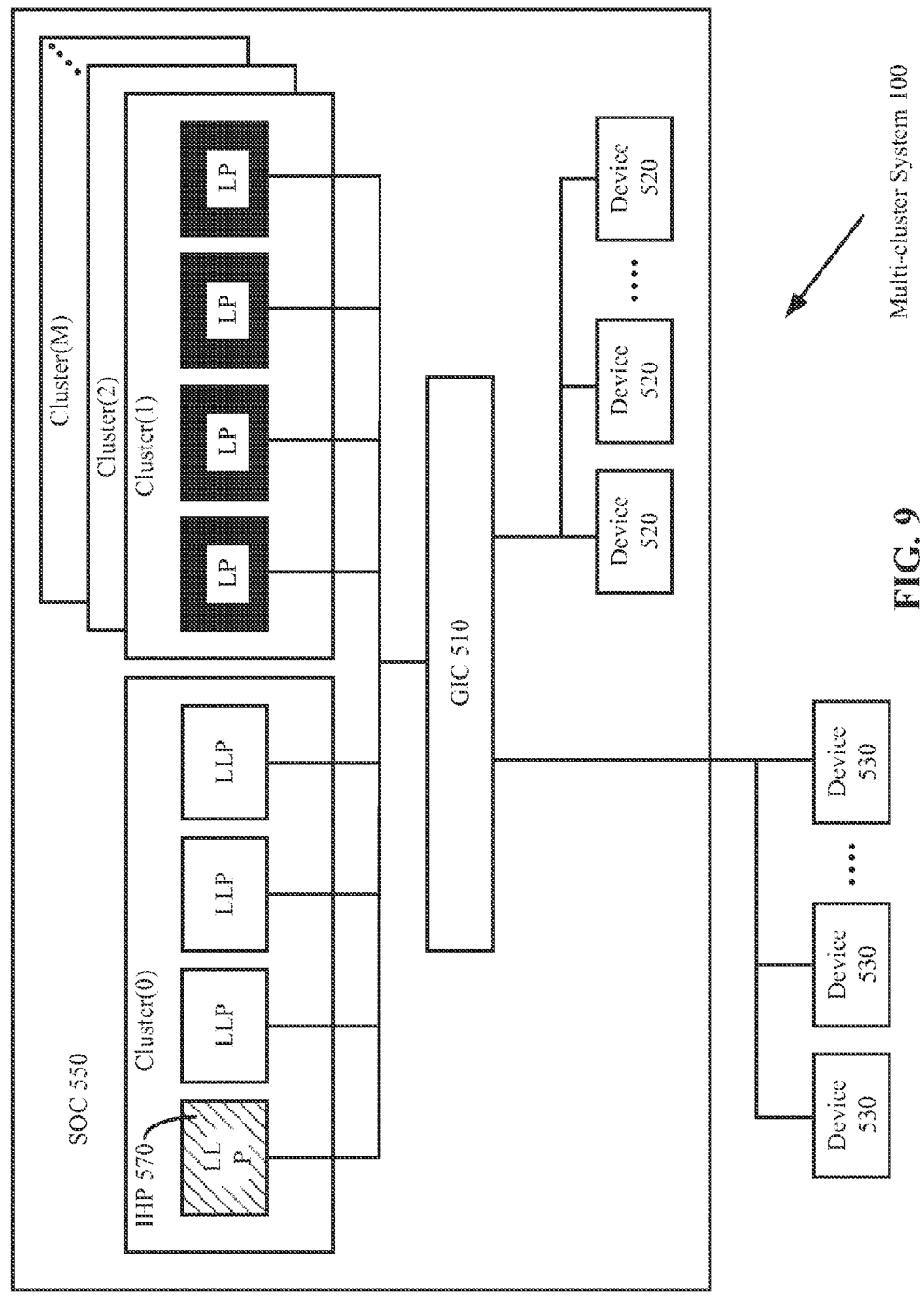
FIG. 9 illustrates the multi-cluster system of FIG. 1 with additional details of the interrupt-handling functionality according to one embodiment.

FIG. 9 illustrates the multi-cluster system 100 of FIG. 1 with additional details of the interrupt-handling functionality, according to one embodiment. In this embodiment, the multi-cluster system 100 includes a global interrupt controller (GIC) 510 coupled to each processor in the system 100 and a plurality of devices 520 and 530. The devices 520 are on-chip; i.e., on the same SOC 550 as the (M+1) clusters, and the devices 530 are off-chip. Examples of the devices 520 include, but are not limited to, graphic processors, signal processors, etc. Examples of the devices 530 include, but are not limited to, system memory, I/O devices, etc. The devices 520 and 530, as well as the processors in the clusters, may generate interrupt requests and send the requests to the GIC 510. The GIC 510 is configured to forward the requests to the interrupt-handling processor core (IHP 570). In one embodiment, in response to a determination to migrate the interrupt requests (e.g., from (S2) to (S4) or from (S1) to (S3) in FIG. 7), the interrupt-handling role of the IHP 570 will migrate to one or more processor cores in another activated cluster.

Figure 10:
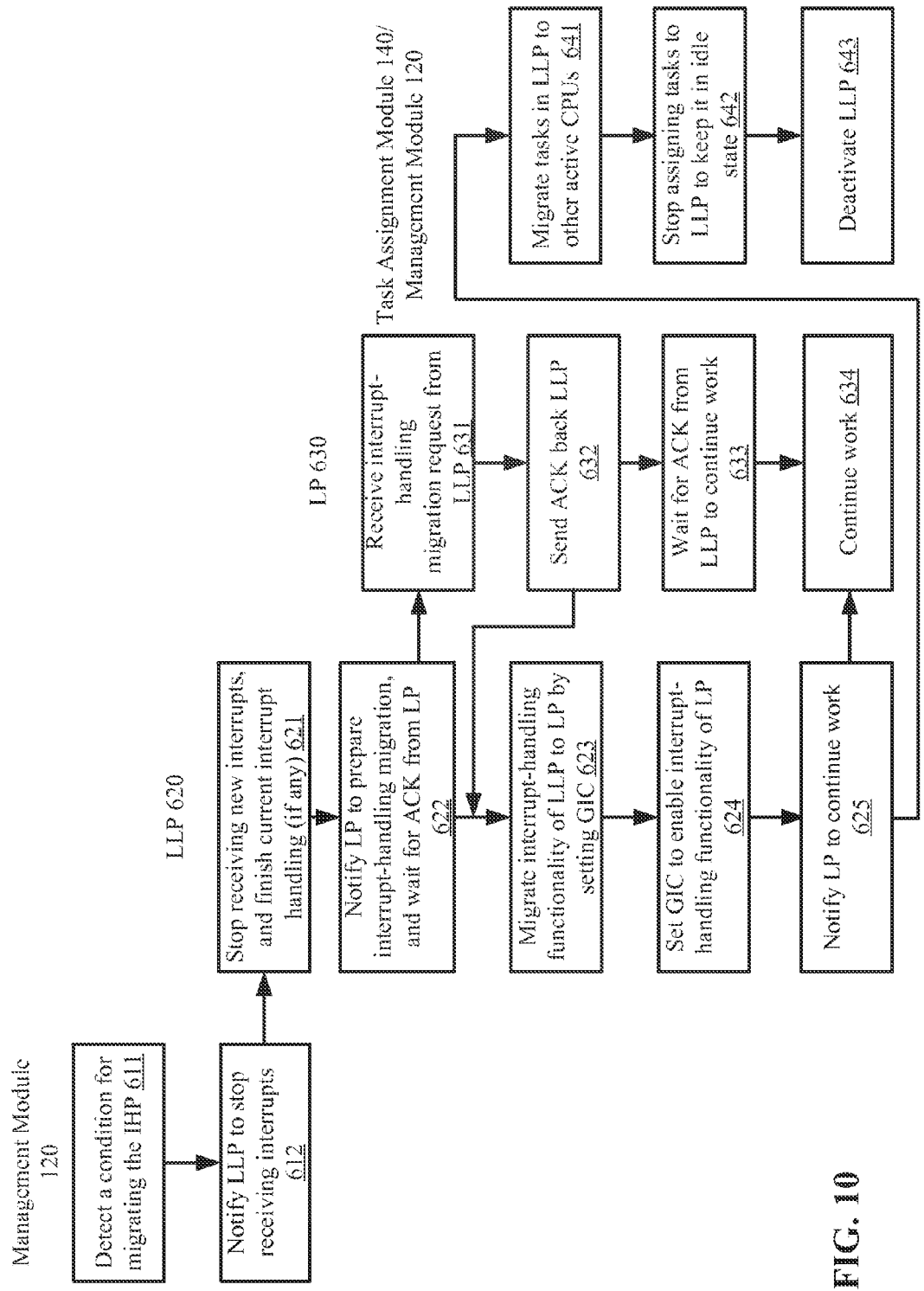
FIG. 10 illustrate a process for migrating interrupt requests and tasks from one cluster to another cluster according to one embodiment.

FIG. 10 is a diagram illustrating a process for migrating interrupt requests and tasks from a processor core (represented by LLP 620) in a first cluster (Cluster(0)) to a processor core (represented by LP 630) in a second cluster (Cluster(1)) according to one embodiment. As an example, initially, Cluster(0) is active and Cluster(1) is inactive. At block 611, the management module 120 detects a condition for migrating interrupt requests from an LLP 620 in Cluster (0) to the LP 630 in Cluster(1) and then deactivating the LLP 620; e.g., the condition for transitions between (S2) and (S4) in FIG. 7. When the event is detected, the management module 120 notifies the LLP 620 to stop receiving interrupts at block 612. Upon receiving the notification from the management module 120 at block 621, the LLP 620 stops receiving new interrupts and finishes current interrupt handling, if there is any. At block 622, the LLP 620 notifies the LP 630 to prepare for the migration of interrupt requests, and wait for an acknowledgement (ACK) from the LP 630. When the LP 630 receives the notification from the LLP 620 at block 631, it sends an ACK back to the LLP 620 at block 632. Then at block 633 the LP 630 waits for an ACK from the LLP 620 to continue work.

After the LLP 620 receives the ACK from the LP 630, at block 623, the LLP 620 migrates the interrupt-handling functionality to the LP 630 by setting the GIC 410 to forward all future interrupt requests to the LP 630. At block 624, the LLP 620 sets the GIC 410 to enable the interrupt-handling functionality of the LP 630. At block 625, the LLP 620 notifies the LP 630 to continue its work. The LP 630 continues its work after receiving the notification at block 634.

Subsequent to or concurrent with the interrupt-handling migration, at block 641 the task assignment module 140 starts to migrate tasks in the LLP 620 to other active CPUs. At block 642, the task assignment module 140 stops assigning tasks to the LLP 620 to keep it in an idle state. Then at block 643, the task assignment module 140 deactivates the LLP 620. In an alternative embodiment, some of the operations in blocks 641-643 may be performed by the management module 120.

Figure 11:
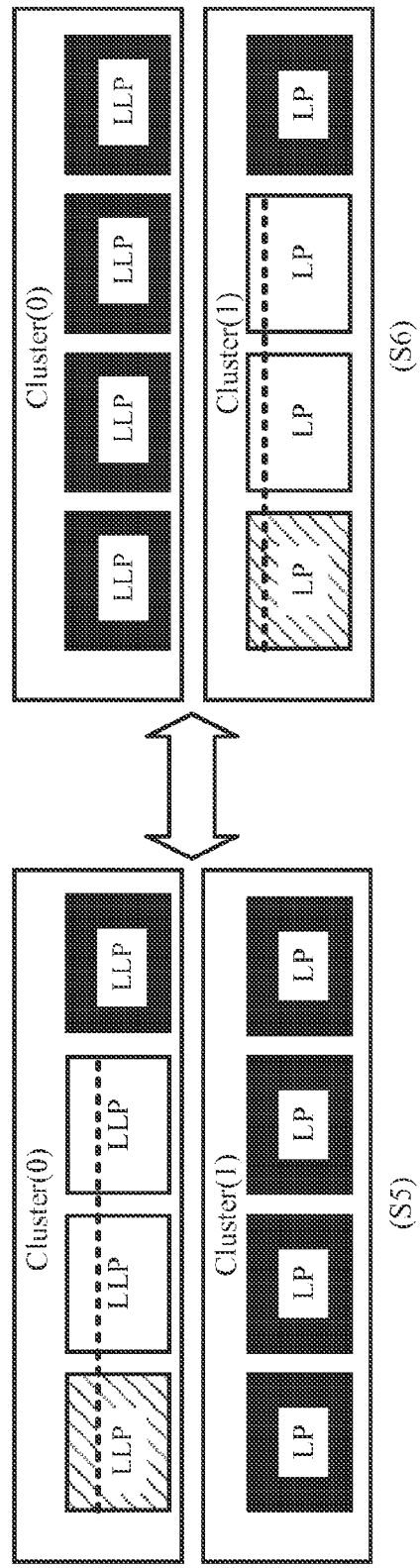
FIG. 11 illustrates transitions between two clusters according to one embodiment.

FIG. 11 is a diagram illustrating transitions between Cluster(0) and Cluster(1) according to one embodiment. As shown in low-performance scenario (S5), initially three out of four processor cores in Cluster(0) are active, with each processor core partially loaded (as indicated by the dotted line across the processor cores). The workload is balanced among the three active processor cores of Cluster(0). The transition from (S5) to the mid-performance scenario (S6) occurs under the same condition as the transition from (S2) to (S4) in FIG. 7. In the transition from (S5) to (S6), Cluster(0) is de-activated and Cluster(1) is activated. Furthermore, interrupt requests migrate from Cluster(0) to Cluster(1). After the transition, the workload is balanced among the three active processor cores of Cluster(1). Similarly, the transition from (S6) to (S5) occurs under the same condition as the transition from (S4) to (S2) in FIG. 7. In the transition from (S6) to (S5), Cluster(1) is de-activated and Cluster(0) is activated. Furthermore, interrupt requests migrate from Cluster(1) to Cluster(0).

This example shows that the transitions may occur even when the first cluster (i.e., the currently active cluster) has one or more inactive processor cores. This example also shows that the number of processors activated in the second cluster (i.e., the target cluster) depends on the current system workload. Thus, some of the processor cores in the second cluster may remain inactive if their processing capacity is not needed at the moment. Before and after the transitions, the workload is balanced among the active processor cores within each cluster.

Figure 12:
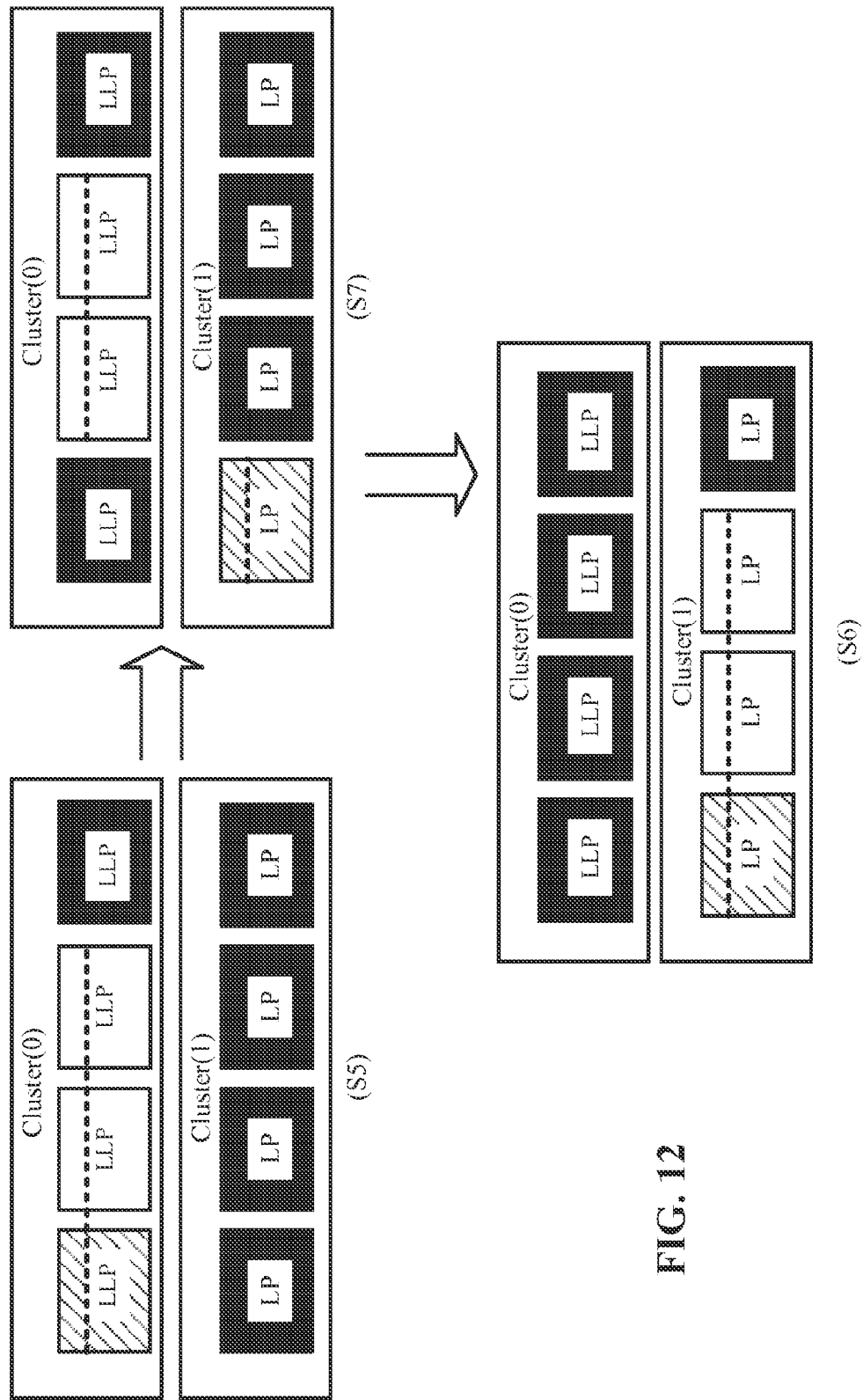
FIG. 12 illustrates transitions between two clusters according to another embodiment.

FIG. 12 is a diagram illustrating transitions between Cluster(0) and Cluster(1) according to another embodiment. In this example, scenarios (S5) and (S6) are the same as in FIG. 11. However, instead of directly transitioning from (S5) to (S6), an intermediate scenario (S7) exists where the interrupt-handling processor core migrates before the other processor cores of Cluster(0). This example illustrates the activation of a cluster and de-activation of another cluster may be performed by one processor core at a time, two processors at a time, or any number of processors at a time.

In scenario (S7), both clusters have one or more active processor cores. In one embodiment, the two clusters may operate at substantially the same frequency; e.g., in the frequency spot SP(0,1). Alternatively, the two clusters may operate in their respective frequency ranges, under the constraints that the operating frequency of Cluster(0) is in a frequency range not higher than SP(0,1) (i.e., on one side of SP(0,1)) and the operating frequency of Cluster(1) is in a frequency range not lower than SP(0,1) (i.e., on the other side of SP(0,1)), such that both cluster can operate with energy efficiency. In some embodiments, a single voltage regulator may supply two different operating frequencies to two different clusters if the difference in their operating frequencies is within a tolerance.

Figure 13:
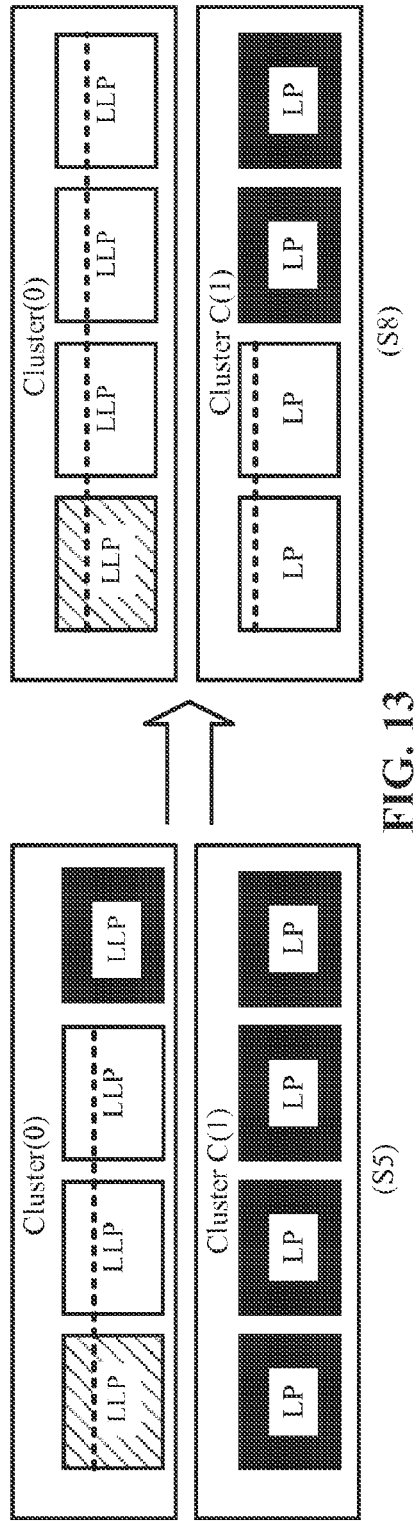
FIG. 13 illustrates a transition between two clusters according to yet another embodiment.

FIG. 13 is a diagram illustrating transitions between Cluster(0) and Cluster(1) according to yet another embodiment. This transition is similar to the transition from (S2) to (S1) in FIG. 7, except that an active cluster may contain one or more inactive processor cores. This example shows a transition from (S5) to (S8), which occurs when the current operating frequency is higher than SP(0,1), and hTLP is greater than the total number of processor cores in Cluster (0). In the transition, the inactive processor cores in Cluster (0) and one or more processor cores in Cluster(1) are activated. Not all of processor cores in Cluster(1) are activated, as long as those active processor cores provide sufficient processing capacity for handling the system workload. The interrupt-handling processor in this example stays in Cluster(0). The workload is balanced among the active processor cores within each cluster.

Figure 14:
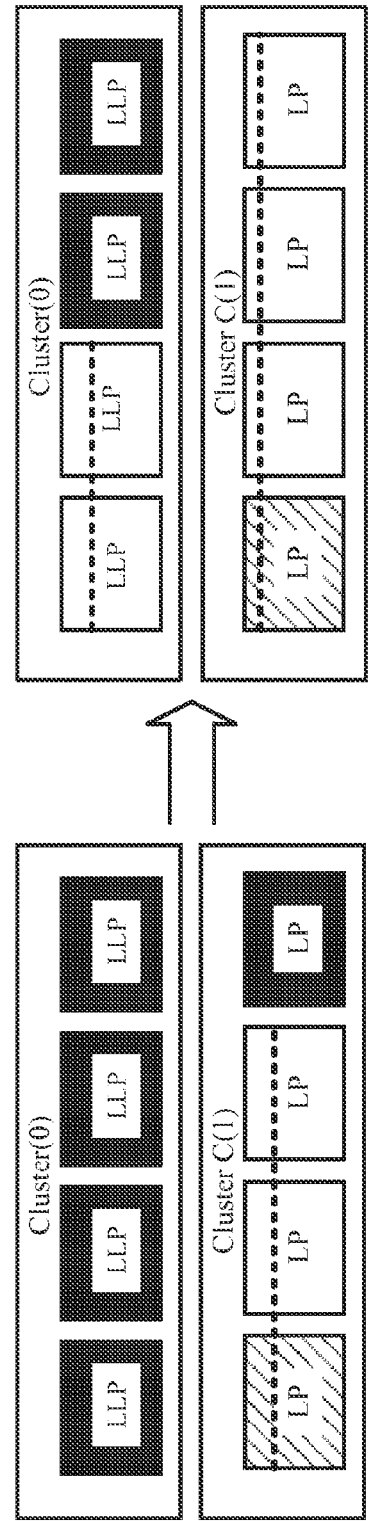
FIG. 14 illustrates a transition between two clusters according to yet another embodiment.

FIG. 14 is a diagram illustrating transitions between Cluster(0) and Cluster(1) according to yet another embodiment. This transition is similar to the transition from (S4) to (S3) in FIG. 7, except that an active cluster may contain one or more inactive processor cores. This example shows a transition from (S6) to scenario (S9), which occurs when the current operating frequency is lower than SP(0,1), and hTLP is greater than the total number of processor cores in Cluster(1). In the transition, the inactive processor core in Cluster(1) and one or more processor cores in Cluster(0) are activated. Not all of processor cores in Cluster(0) are activated, as long as those active processor cores provide sufficient processing capacity for handling the system workload. The interrupt-handling processor in this example stays in Cluster(1). The workload is balanced among the active processors within each cluster.

In some embodiments, all of the above transitions can be triggered by usage scenarios. For example, the system 100 may activate and de-activate different processor cores and clusters according to a number of pre-determined usage scenarios. For example, (S1) to (S2) transition, as shown in FIG. 7, may be triggered by turning on the screen, and (S2) to (S1) transition may be triggered by turning off the screen. The usage scenarios may trigger the transition of any of the transitions illustrated in FIGS. 11-14.

Various functional components or blocks have been described herein. As will be appreciated by persons skilled in the art, the functional blocks will preferably be implemented through circuits (either dedicated circuits, or general purpose circuits, which operate under the control of one or more processors and coded instructions), which will typically comprise transistors that are configured in such a way as to control the operation of the circuitry in accordance with the functions and operations described herein. The specific structure or interconnections of the transistors may be determined by a compiler, such as a register transfer language (RTL) compiler. RTL compilers operate upon scripts that closely resemble assembly language code, to compile the script into a form that is used for the layout or fabrication of the ultimate circuitry. RTL is well known for its role and use in the facilitation of the design process of electronic and digital systems.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:
1. A computing system comprising:
a plurality of processor cores in a hierarchy of groups, the hierarchy of groups comprising:
a plurality of level-1 groups, each of the level-1 groups including one or more of the processor cores having identical energy efficiency characteristics, and each of the level-1 groups configured to be assigned first tasks by a respective level-1 scheduler;
one or more level-2 groups, each of the one or more level-2 groups including a respective plurality of level-1 groups, the processor cores in different level-1 groups of a same level-2 group having different energy efficiency characteristics, and each of the one or more level-2 groups configured to be assigned second tasks by a respective level-2 scheduler; and
a level-3 group including the one or more level-2 groups and configured to be assigned third tasks by a level-3 scheduler,
wherein in response to detecting a predefined change of a current operating frequency of an active level-1 group in a given level-2 group, a level-2 scheduler of the given level-2 group is configured to activate at least one processor core in a target level-1 group in the given level-2 group, and to transition interrupt-handling processing from the active level-1 group to the target level-1 group.

2. The computing system of claim 1, wherein the level-3 group further comprises one or more level-1 groups not belonging to any level-2 group.

3. The computing system of claim 1, wherein any two processor cores of different level-1 groups in a same level-2 group have a closer distance between corresponding energy efficiency characteristic curves than any two processor core of different level-1 groups in different level-2 groups, wherein each energy efficiency characteristic curve is a graph showing power consumption versus frequency for a corresponding processor core.

4. The computing system of claim 1, wherein in a same level-2 group, a first energy efficiency characteristic curve of a first processor core in a first level-1 group has at least one predetermined frequency spot crossing or adjacent to a second energy efficiency characteristic curve of a second processor core in a second level-1 group, wherein each of the first energy efficiency characteristic curve and the second energy efficiency characteristic curve is a graph showing power consumption versus frequency for a corresponding processor core.

5. The computing system of claim 1, wherein in two different level-2 groups, a respective energy efficiency characteristic curve of each processor core in a first level-2 group is at least a threshold distance away from a respective energy efficiency characteristic curve of each processor core in a second level-2 group, wherein the respective energy efficiency characteristic curve is a graph showing power consumption versus frequency for a corresponding processor core.

6. The computing system of claim 1, wherein each of the level-1 groups has a Symmetric Multiprocessing (SMP) architecture.

7. The computing system of claim 1, wherein the respective level-1 scheduler is an SMP scheduler.

8. The computing system of claim 1, wherein the level-3 group has a Heterogeneous Multiprocessing (HMP) architecture.

9. The computing system of claim 1, wherein the level-3 scheduler is an HMP scheduler.

10. The computing system of claim 1, wherein the level-3 scheduler is an In-kernel switcher (IKS) scheduler.

11. The computing system of claim 1, wherein each of the level-2 groups has an Asymmetric Multiprocessing (AMP) architecture.

12. The computing system of claim 1, wherein the level-2 scheduler is an IKS scheduler.

13. The computing system of claim 1, wherein the level-2 scheduler is an AMP scheduler.

14. The computing system of claim 13, wherein in each of the level-2 groups, each level-1 group has one or more predetermined frequency spots, each frequency spot associated with the level-1 group and a respective other level-1 group in the same level-2 group.

15. The computing system of claim 13, wherein the AMP scheduler of the given level-2 group is configured to detect an event in which a current operating frequency of the active level-1 group in the given level-2 group enters or crosses any of one or more predetermined frequency spots of the active level-1 group, wherein the active level-1 group includes one or more first processor cores; and when the event is detected, the AMP scheduler is configured to:
identify the target level-1 group in the given level-2 group, wherein each first processor core in the active level-1 group and each second processor core in the target level-1 group have different energy efficiency characteristics;
activate at least one second processor core in the target level-1 group;
determine whether to migrate one or more interrupt requests from the active level-1 group to the target level-1 group; and
determine whether to deactivate at least one first processor core of the active level-1 group based on a performance and power requirement.

16. The computing system of claim 1, wherein after each of the level-1 schedulers performs load balance between the processor cores in the corresponding level-1 group, each of the one or more level-2 schedulers performs load balance between the processor cores in the corresponding level-2 group, and then the level-3 scheduler performs load balance between the processor cores in the level-3 group.

17. A computing system comprising:
a plurality of processor cores in a hierarchy of groups, the hierarchy of groups comprising
a plurality of level-1 groups, each of the level-1 groups including one or more of the processor cores and configured to have a Symmetric Multiprocessing (SMP) architecture;
one or more level-2 groups, each of the one or more level-2 groups including a respective plurality of level-1 groups, the processor cores in different level-1 groups of the same level-2 group having different energy efficiency characteristics; and
a level-3 group, including the one or more level-2 groups and configured to have a Heterogeneous Multiprocessing (HMP) architecture,
wherein in response to detecting a predefined change of a current operating frequency of an active level-1 group in a given level-2 group, a level-2 scheduler of the given level-2 group is configured to activate at least one processor core in a target level-1 group in the given level-2 group and to transition interrupt-handling processing from the active level-1 group to the target level-1 group.

18. The computing system of claim 17, wherein the one or more level-2 groups are at one of a plurality of internal levels of the hierarchy, each internal level including respective one or more level-2 groups.

19. The computing system of claim 17, wherein each of the level-1 groups is configured to be assigned with tasks by a respective SMP scheduler.

20. The computing system of claim 17, wherein each of the one or more level-2 groups is configured to be assigned with tasks by a respective level-2 scheduler.

21. The computing system of claim 17, wherein the level-3 group is configured to be assigned with tasks by a level-3 scheduler.

22. A computing system comprising:
a plurality of processor cores in a hierarchy of groups, the hierarchy of groups comprising:
one or more leaf-level groups, at least two of the processor cores in a same leaf-level group having different energy efficiency characteristics, and each of the one or more leaf-level groups configured to be assigned first tasks by a respective leaf-level scheduler; and
a root-level group, including the one or more leaf-level groups and configured to be assigned second tasks by a root-level scheduler,
wherein in response to detecting a predefined change of a current operating frequency of an active leaf-level group, a leaf-level scheduler is configured to activate at least one processor core in a target leaf-level group, and to transition interrupt-handling processing from the active leaf-level group to the target leaf-level group.

23. The computing system of claim 22, wherein any two processor cores of a same leaf-level group have a closer distance between corresponding energy efficiency characteristic curves than any two processor core of different leaf-level groups, wherein each energy efficiency characteristic curve is a graph showing power consumption versus frequency for a corresponding processor core.

24. The computing system of claim 22, wherein in a same leaf-level group, a first energy efficiency characteristic curve of a first processor core has at least one predetermined frequency spot crossing or adjacent to a second energy efficiency characteristic curve of a second processor core, wherein each of the first energy efficiency characteristic curve and the second energy efficiency characteristic curve is a graph showing power consumption versus frequency for a corresponding processor core.

25. The computing system of claim 22, wherein in two different leaf-level groups, a respective energy efficiency characteristic curve of each processor core in a first leaf-level group is at least a threshold distance away from a respective second energy efficiency characteristic curve of each processor core in a second leaf-level group, wherein the respective energy efficiency characteristic curve is a graph showing power consumption versus frequency for a corresponding processor core.

26. The computing system of claim 22, wherein the leaf-level scheduler is an Asymmetric Multiprocessing (AMP) scheduler.

27. The computing system of claim 22, wherein the root-level group has a Heterogeneous Multiprocessing (HMP) architecture.

28. The computing system of claim 22, wherein the root-level scheduler is an HMP scheduler.

29. The computing system of claim 22, wherein the root-level scheduler is an In-kernel Switcher (IKS) scheduler.

30. The computing system of claim 22, wherein after each of the leaf-level schedulers performs load balance between the processor cores in the corresponding leaf-level group, the root-level scheduler performs load balance between the processor cores in the root-level group.

31. A computing system comprising:
a plurality of processor cores in a hierarchy of groups, the hierarchy of groups comprising:
one or more leaf-level groups, at least two of the processor cores in at least one leaf-level group having different energy efficiency characteristics in a same leaf-level group; and
a root-level group, including the one or more leaf-level groups and configured to have a Heterogeneous Multiprocessing (HMP) architecture,
wherein in response to detecting a predefined change of a current operating frequency of an active leaf-level group, a leaf-level scheduler is configured to activate at least one processor core in a target leaf-level group, and to transition interrupt-handling processing from the active leaf-level group to the target leaf-level group.

32. The computing system of claim 31, wherein at least one of the leaf-level groups is configured to be assigned tasks by an Asymmetric Multiprocessing (AMP) scheduler.

33. The computing system of claim 31, wherein the root-level group is assigned with tasks by a root-level scheduler.

* * * * *